(12) United States Patent
Kamiya

(10) Patent No.: US 10,009,133 B2
(45) Date of Patent: Jun. 26, 2018

(54) MIMO DEMODULATING APPARATUS AND METHOD, AND LINE-OF-SIGHT WIRELESS COMMUNICATIONS SYSTEM

(71) Applicant: NEC CORPORATION, Tokyo (JP)

(72) Inventor: Norifumi Kamiya, Tokyo (JP)

(73) Assignee: NEC CORPORATION, Toky (JP)

( * ) Notice: Subject to any disclaimer, the term of this patent is extended or adjusted under 35 U.S.C. 154(b) by 0 days. days.

(21) Appl. No.: 15/540,834

(22) PCT Filed: Dec. 15, 2015

(86) PCT No.: PCT/JP2015/085113
§ 371 (c)(1),
(2) Date: Jun. 29, 2017

(87) PCT Pub. No.: WO2016/111126
PCT Pub. Date: Jul. 14, 2016

(65) Prior Publication Data
US 2018/0019835 A1 Jan. 18, 2018

(30) Foreign Application Priority Data
Jan. 5, 2015 (JP) .................................. 2015-000183

(51) Int. Cl.
*H04L 1/00* (2006.01)
*H04J 11/00* (2006.01)
(Continued)

(52) U.S. Cl.
CPC ........ *H04J 11/0046* (2013.01); *H04B 7/0871* (2013.01); *H04J 11/0053* (2013.01); *H04L 1/0048* (2013.01); *H04L 25/0204* (2013.01)

(58) Field of Classification Search
CPC . H04J 11/0046; H04J 11/0053; H04B 7/0871; H04L 1/0048; H04L 25/0204
See application file for complete search history.

(56) References Cited

U.S. PATENT DOCUMENTS

| 8,243,834 B2 * | 8/2012 | Kishigami ............. H04B 7/084 375/260 |
| 2002/0047384 A1 * | 4/2002 | Matsumoto ......... F04D 25/0613 310/89 |

(Continued)

FOREIGN PATENT DOCUMENTS

| JP | 2006-197132 A | 7/2006 |
| JP | 2010-119070 A | 5/2010 |

(Continued)

OTHER PUBLICATIONS

Tryggvi Ingason et al., "Impact of Frequency Selective Channels on a Line-of-Sight MIMO Microwave Radio Link", Vehicular Technology Conference, 2010 IEEE 71 st, May 19, 2010, pp. 1-5.

(Continued)

*Primary Examiner* — Dac Ha
(74) *Attorney, Agent, or Firm* — Sughrue Mion, PLLC

(57) ABSTRACT

A MIMO demodulating apparatus includes: a phase difference corrector that compensates for a phase shift by utilizing the phase difference between received signals to output phase corrected signals; an interference compensator that receives the phase corrected signals as input and, by means of adaptive control, performs elimination of interference and separation and extraction of a desired signal; a phase noise compensator to compensate for phase error remaining in the desired signal; a signal determiner that determines transmitted data from the output signal of the phase noise compensator to output the transmitted data and outputs an error signal; and an error signal phase rotator that subjects the error signal to a phase rotating process in accordance with the phase error compensation amount to perform adaptive control.

18 Claims, 13 Drawing Sheets

(51) Int. Cl.
   *H04B 7/08*   (2006.01)
   *H04L 25/02*  (2006.01)

(56) References Cited

U.S. PATENT DOCUMENTS

2002/0191535 A1* 12/2002 Sugiyama ................. H04L 1/06
                                                370/208
2014/0348277 A1* 11/2014 Rydstrom .............. H04B 7/084
                                                375/350

FOREIGN PATENT DOCUMENTS

| WO | 2008/059985 A1 | 5/2008 |
| WO | 2008/099964 A1 | 8/2008 |
| WO | 2009/069798 A1 | 6/2009 |
| WO | 2009/093233 A2 | 7/2009 |

OTHER PUBLICATIONS

P.F. Driessen et al., "On the Capacity Formula for Multiple Input-Multiple Output Wireless Channels: A Geometric Interpretation", IEEE Transactions on Communications, Feb. 1999, pp. 173-176, vol. 47, No. 2.

Ioannis Sarris et al., "Maximum MIMO Capacity in Line-of-Sight", IEEE International Conference on Information, Communications and Signal Processing, Dec. 2005, pp. 1236-1240.

International Search Report for PCT/JP2015/085113 dated Feb. 2, 2016.

\* cited by examiner

MIMO DEMODULATING APPARATUS AND METHOD, AND LINE-OF-SIGHT WIRELESS COMMUNICATIONS SYSTEM

CROSS REFERENCE TO RELATED APPLICATIONS

This application is a National State of International Application No. PCT/JP2015/085113 filed Dec. 15, 2015, claiming priority based on Japanese Patent Application No 2015-000183 filed Jan. 5, 2015, the contents of all of which are incorporated herein by reference in their entirety.

TECHNICAL FIELD

The present invention relates to line-of-sight (LOS) wireless communications using frequency bands such as microwaves and millimeter wave bands, in particular, relating to a multiple-input multiple-output (MIMO) wireless communications system whose communication capacity in wireless communication can be increased.

BACKGROUND ART

In recent years, as a technology for increasing communication capacity without widening the occupied frequency band, MIMO communications systems that use multiple transmitting antennas and multiple receiving antennas have been put into use in wireless communications. This technology has been developed so far, mainly aiming at application to non-line-of-sight (NLOS) mobile communications systems, such as mobile phones, wireless LANs (Local Area Networks) and the like. However, recently, application of this technology to line-of-sight fixed wireless communications systems using microwaves and millimeter waves has been being investigated.

In line-of-sight fixed wireless systems, increase in communication capacity has been previously achieved in a limited bandwidth by means of ultra-multilevel modulation using increased number of modulation levels and polarization multiplexing using both horizontal and vertical polarizations. However, as a technology for meeting the demand for large communication capacity accompanied by increase in traffic, MIMO technology has drawn attention.

Driessen et al. describes the principle of MIMO transmission in line-of-sight (LOS-MIMO) fixed wireless communications [NPL 1]. Driessen et al. [NPL 1] and Sarris et al. [NPL 2] demonstrated that adjusting the difference between transmission delays by appropriate arrangement of multiple transmitting antennas and receiving antennas contributes to improvement of the signal-to-noise ratio thanks to the carrier's phase rotation resulting from the adjusted transmission delay difference to enable increase in communication capacity. In a case having two transmitting antennas and two receiving antennas, the signal-to-noise ratio is expected to improve by 3 dB at most with communication capacity doubled, compared to the ordinary single-input single-output (SISO) transmission having one transmitting antenna and one receiving antenna. The line-of-sight MIMO communications of this kind is distinguished from non-line-of-sight MIMO (NLOS-MIMO) communications in mobile communications, wireless LANs, etc. which positively and effectively use multiplexed transmission waves temporally varying due to superposition of many signals resulting from wave reflection, diffraction and dispersion.

Examples of the MIMO communications in such line-of-sight fixed wireless systems using the microwave bands and millimeter wave bands have been disclosed in [PTL 1], [PTL 2] and [PTL 3]. The systems disclosed in these references include a tandem configuration having a means for separating and extracting a desired signal from received signals that have been multiplexed by MIMO transmission and a means for performing an ordinary demodulating process for the extracted signal. The ordinary demodulating process means a demodulation process as generally used in SISO transmission with a single transmitting antenna and single receiving antenna. The signal separating and extracting means for MIMO realizes signal separation by transmitting a pilot signal sequence made of a number of symbols forming orthogonal patterns to estimate parameters representing a MIMO channel model, and then subjecting the received signals to inverse transform signal processing corresponding to the multiplexing that arose through the MIMO transmission channel. Particularly, the system described in [PTL 1], in addition to spatial multiplexing by MIMO, also uses polarization multiplexing, further including an interference compensator for removing interfering components between polarizations to perform MIMO demodulation on the signal with interfering components between polarizations removed.

Further, Ingson et al. discloses a MIMO demodulating method in which a signal separating means for MIMO is integrated with an equalizer for compensating intersymbol interference resulting from fading [NPL 3]. According to this method, it is possible to perform transmission channel estimation based on simple known signals without the necessity of a pilot signal sequence of some known symbols forming orthogonal patterns, and perform demodulation by controlling the signal processing as to MIMO and the tap coefficients of the equalizer for compensating intersymbol interference based on the error signals after the interference removing process.

In the line-of-sight fixed wireless communications using microwaves or millimeter waves, in order to increase the communication capacity, ultra-multilevel transmission using 1024 QAM (Quadrature Amplitude Modulation) or higher-order QAM has been already used. In order to achieve a further higher capacity, the MIMO transmission technology needs to be used together with the ultra-multilevel modulation. However, when MIMO transmission is applied to fixed wireless communication in the microwave band or millimeter wave band, from the requirements on the intervals between transmitting antennas (and the requirements on the intervals between receiving antennas), specifically, because of the necessity of widening the distances between the transmitting antennas and also widening the distances between the receiving antennas, it is impossible to handle the phase noise arising at each antenna in common with that at the others. Accordingly, it is necessary to treat the phase noise associated with each antenna independent from that of the other. However, there is a problem that such independent phase noise remarkably degrades the quality of communication in MIMO transmission. Therefore, in the line-of-sight MIMO communications system, in order to realize further development of high capacity, high quality and low cost configurations, there has been a demand for a MIMO demodulating apparatus and MIMO demodulating method that has a phase noise compensation function and an interference compensation function.

In the aforementioned MIMO demodulating method using the tandem arrangement of the MIMO signal separation processing and SISO (Single-Input Single-Output) demodulation processing, the temporal variation of phase noise independent at each antenna is faster than the variation of the parameters representing the MIMO transmission channel model. Therefore, the pilot signal sequence consisting of some known symbols forming orthogonal patterns needs to be transmitted at a higher frequency so as to follow the temporal variation of phase noise, which significantly limits the original purpose, or increase of communication capacity. Also in the MIMO demodulating method in which a signal separating means for MIMO and an equalizer for compensating intersymbol interference from fading are integrated, it is difficult, if the phase noise at each of the transmitting antennas and receiving antenna is independent from the others, to avoid degradation of communication quality resulting from this.

As a technology of compensating phase noise in a MIMO communications system, there is a proposal that when MIMO communication is performed between two wireless stations (sites) performing bidirectional communication, measurement of a phase shift is performed based on phase measurement on the forward channel so as to calculate a phase correction to the backward channel based on the measured phase shift and apply the calculated phase correction to the backward channel [PTL 4]. However, since the line-of-sight system is not always applied to bidirectional communication, the method disclosed in [PTL 4] is less versatile. As a technology of compensating phase noise by a process performed on the receiving side, there is a proposal that, in order to compensate phase noise at local oscillation at the receiver, the phase noise at local oscillation is estimated based on a channel estimate determined from the received pilot signal and a transmit replica generated from the signal after error correction, to thereby perform phase noise compensation by multiplying the received signal by the complex conjugate of the estimated phase noise [PTL 5]. However, the technology of [PTL 5] can compensate for the phase noise at local oscillation, but cannot compensate for phase noise that varies independently at multiple receiving antennas.

Further, in line-of-sight fixed wireless communication using the microwave band or millimeter wave band, ultra-multilevel transmission is used together with polarization multiplexing transmission using horizontal polarization and vertical polarization, hence the MIMO demodulating method in the line-of-sight fixed wireless communications system need to be used in combination with such ultra-multilevel modulation and polarization multiplexing transmission. Similarly, also in this case, deterioration of communication quality due to phase noise independently arising at every antenna and for each polarization causes serious problem, so that the number of multiple levels of the signal for each transmission path is limited, making it difficult to use line-of-sight MIMO, polarization multiplexing and ultra-multilevel transmission in combination.

CITATION LIST

Patent Literature

[PTL 1]: WO2009/069798
[PTL 2]: WO2008/099964
[PTL 3]: WO2008/059985
[PTL 4]: WO2009/093233
[PTL 5]: JP2010-119070A

Non-Patent Literature

[NPL 1]: P. F. Driessen and G. J. Foschini, "On the Capacity Formula for Multiple Input-Multiple Output Wireless Channels: A Geometric Interpretation," IEEE Transactions on Communications, Vol. 47, No. 2, pp. 173-176, February 1999.

[NPL 2]: I. Sarris and A. R. Nix, "Maximum MIMO Capacity in Line-of-Sight," IEEE International Conference on Information, Communications and Signal Processing (ICICS), Proceedings, pp. 1236-1240, December 2005.

[NPL 3]: T. Ingason, H. Liu, M. Coldrey, A. Wolfgang, and J. Hansryd, "Impact of Frequency Selective Channels on a Line-of-Sight MIMO Microwave Radio Link," IEEE Vehicular Technology Conference (VTC), Proceedings, May 2010.

SUMMARY OF THE INVENTION

Problems to be Solved by the Invention

As to line-of-sight MIMO transmission in a fixed wireless system using the microwave band or millimeter wave band, when independent and high-level phase noise arises at each antenna, it is impossible for the MIMO demodulator and demodulation based on the above method to avoid deterioration of communication quality, hence the number of multiple levels in transmission is limited thereby. Accordingly, combined use of multilevel transmission and MIMO transmission becomes difficult, and no significant increase in communication capacity can be expected compared to the case without adoption of MIMO technology, exhibiting the problem that the benefits of introducing MIMO technology are poor. Further, similarly, also in the case using polarization multiplexing in combination, combined use of multilevel transmission, polarization multiplexing and MIMO transmission is difficult due to phase noise arising at each antenna and for each polarization, there is the problem that no significant increase in communication capacity can be expected from introduction of MIMO technology. Moreover, attempt of using antenna units with a markedly low phase noise level to realize a high-capacity communications system based on combined use of multilevel transmission, polarization multiplexing and MIMO transmission, gives rise to a problem that it involves a large cost increase.

The present invention has been devised under the above circumstances, it is therefore an object of the present invention to provide a MIMO demodulating apparatus and method that enable compensation for independent phase noise at each antenna and combined use of multilevel transmission and line-of-sight MIMO transmission as well as providing a MIMO wireless communications system built in with the MIMO demodulating apparatus.

Means for Solving the Problems

According to one exemplary aspect of the present invention, a MIMO demodulating apparatus, which is used in a line-of-sight multiple input multiple output wireless communications system that uses multiple transmitting antennas and multiple receiving antennas to implement multiplexing of channels utilizing difference in transmission delay adjusted based on inter-antenna spacing, and which estimates transmitted data from received signals respectively received at the multiple receiving antennas, includes: a phase difference corrector that compensates for the phase shift of each received signal by utilizing the phase difference between received signals received at the multiple antennas to output the phase corrected signal of each of the received signals; an interference compensator that receives the multiple phase corrected signals as input and, by means of adaptive control, performs elimination of interference in the received signals inclusive of intersymbol interference, and separation and extraction of a desired signal from multiplexed signals transmitted through the transmission channels to output a desired signal; a phase noise compensator connected to the interference compensator to compensate for phase error remaining in the desired signal; a signal determiner that determines transmitted data from the output signal of the phase noise compensator to output the transmitted data, and outputs the difference between the output signal from the phase noise compensator and the transmitted data as an error signal; and an error signal phase rotator that subjects the error signal to a phase rotating process in accordance with the phase error compensation amount at the phase noise compensator, wherein the error signal subjected to the phase rotating process at the error signal phase rotator is used for adaptive control in the interference compensator, and the phase difference is determined in the phase difference corrector, based on a signal that is inserted into the sequence of the transmitted signal and known to the receiving side.

According to another exemplary aspect of the present invention, a MIMO demodulating method which, in a line-of-sight multiple input multiple output wireless communications system that uses multiple transmitting antennas and multiple receiving antennas to implement multiplexing of channels utilizing difference in transmission delay adjusted based on inter-antenna spacing, estimates transmitted data from received signals respectively received at the multiple receiving antennas, includes: determining the phase difference between the received signals received by the multiple antennas, based on a signal that is known to the receiving side and inserted in a sequence of the transmitted signal; outputting a phase corrected signal by compensating for the phase shift of each received signal by utilizing the phase difference; performing, for a plurality of the phase corrected signals, elimination of interference in the received signals inclusive of intersymbol interference, and separation and extraction of a desired signal from multiplexed signals transmitted through the transmission channels, by means of adaptive control; compensating for phase error remaining in the desired signal; determining and outputting transmitted data based on the desired signal of which the phase error has been compensated for; and regarding the difference between the desired signal of which the phase error has been compensated for and the transmitted data as an error signal and subjecting the error signal to a phase rotating process in accordance with the phase error compensation amount, wherein the error signal having been subjected to the phase rotating process is used for the adaptive control.

According to still another exemplary embodiment of the present invention, a line-of-sight multiple input and multiple output wireless communications system is a system that performs multiplexing of transmission channels based on the difference between transmission delays adjusted by spacing distance between antennas, and includes: a transmitter including a plurality of transmitting antennas each sending out a transmitted signal; and a receiver including a plurality of receiving antennas and the MIMO demodulating apparatus described above for estimating transmitted data from the received signal received at each of the receiving antennas.

According to the present invention, it is possible to compensate for independent phase noise at each of antennas by determining phase difference between received signals based on a known signal and compensating for the phase shift of each received signal by use of the phase difference, hence making it possible to use multi-level transmission and line-of-sight MIMO transmission in combination.

DESCRIPTION OF EMBODIMENTS

Next, exemplary embodiment of the present invention will be described with reference to the drawings. Here, the constituents described in the following exemplary embodiments are given for exemplifying purposes, and should not be taken to limit the technical scope of the present invention thereto.

Figure 1:
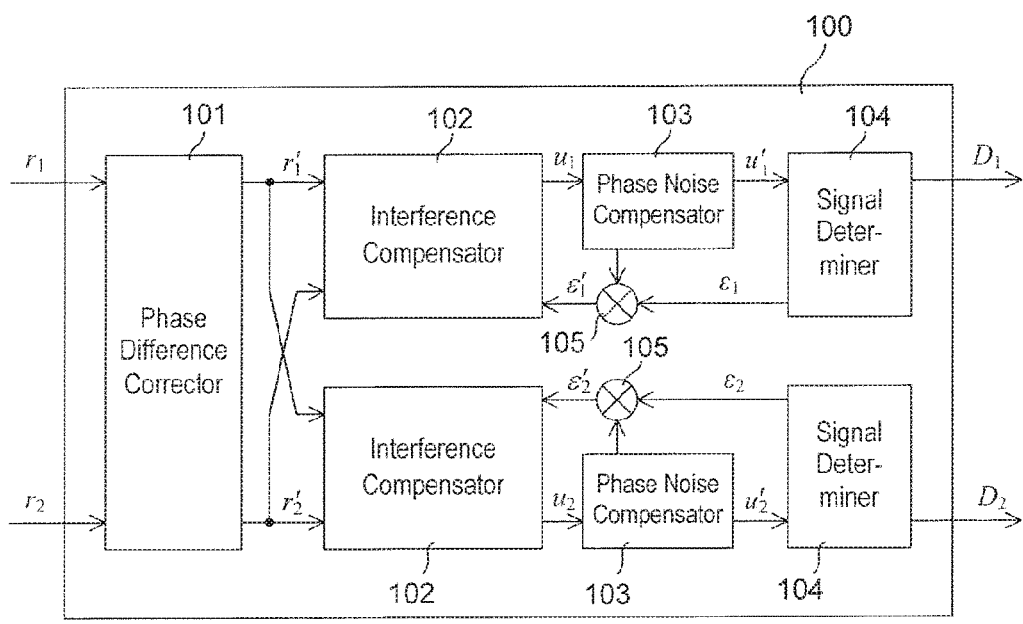
FIG. 1 is a block diagram showing a configuration of a line-of-sight MIMO demodulating apparatus according to a first exemplary embodiment of the present invention.

FIG. 1 is a MIMO demodulating apparatus according to the first exemplary embodiment of the present invention. This MIMO demodulating apparatus 100 is an apparatus that is used in a 2×2 line-of-sight MIMO transmission system (see FIG. 2) in which independent data streams are sent out from two transmitting antennas and the transmitted signals are received by two receiving antennas, and that recovers the original two data streams from received signals $r_1$, $r_2$ obtained through the two receiving antennas to give output data $D_1$, $D_2$. This MIMO demodulating apparatus 100 includes: phase difference corrector 101; two interference compensators 102; two phase noise compensators 103; two signal determiners 104; and two phase rotators 105. Phase difference corrector 101 is provided in common for two streams of output data $D_1$, $D_2$ while interference compensator 102, phase noise compensator 103, signal determiner 104 and phase rotator 105 are provided for each of the two streams of output data $D_1$, $D_2$. Phase rotator 105 is also called error signal phase rotator.

Phase difference corrector 101 receives input of two received signals $r_1$, $r_2$, respectively from two receiving antennas and corrects phase shifts due to phase noise arising independently at these two receiving antennas to output two phase corrected signals $r_1'$, $r_2'$. Interference compensator 102 is a unit that receives the two signals $r_1'$, $r_2'$ with their phase shift corrected. Then interference compensator 102 performs, by means of adaptive control, removal of interference in received signals $r_1$, $r_2$ inclusive of intersymbol interference and a process of separating and extracting a desired signal from the multiplexed transmitted signals to output the desired signal. As one example, interference compensator 102 removes intersymbol interference resulting from fading and the like arising during transmission through MIMO transmission channels and separates two transmitted signals multiplexed in the MIMO transmission channels. Then interference compensator 102 outputs one of the signals as the desired signal. Herein, the desired signal from interference compensator 102 arranged on the side of output data $D_1$ is denoted by $u_1$, and the desired signal from interference compensator 102 arranged on the side of output data $D_2$ is denoted by $u_2$. Other than two received signals $r_1'$, $r_2'$ with their phase shift corrected, control signals used for adaptive control for optimally performing the compensation of intersymbol interference and the separation of signals are also supplied to interference compensator 102.

Phase noise compensator 103 compensates for phase noise remaining in the output signals from interference compensator 102, i.e., desired signal $u_1$, $u_2$, to output signal $u_1'$, $u_2'$, and also outputs the phase compensation amount used for phase noise compensation as a phase error compensation signal. Signal determiner 104 determines, from output signal $u_1'$, $u_2'$ of phase noise compensator 103, transmitted signal $s_1$, $s_2$ closest to the output signals $u_1'$, $u_2'$, and outputs the data corresponding to the obtained estimated transmitted signal as transmission data $D_1$, $D_2$. Signal determiner 104 also outputs the difference between determined transmitted signal $s_1$, $s_2$ and signal $u_1'$, $u_2'$ as an error signal. The error signal supplied from signal determiner 104 for each of output data $D_1$, $D_2$ is supplied to phase rotator 105 and phase-compensated by means of the phase error compensation signal from phase noise compensator 103 to be used as the control signal for interference compensator 102.

In the present exemplary embodiment, two stages of compensation are performed such that the received signal is compensated first for the phase shift resulting from the phase noise independently arising at each of the multiple receiving antennas, then compensated for interference, and thereafter compensation for the residual phase noise containing phase noise at the transmitting antennas is performed. As a result, it is possible to compensate for deterioration due to independent phase noise at each antenna, and realize high-capacity data communication by combined use of multilevel transmission and line-of-sight MIMO transmission.

Next, the operation of MIMO demodulating apparatus 100 of the present exemplary embodiment will be described in conjunction with MIMO wireless transmission scheme. Herein, a modulation scheme that identifies data based on phase information is assumed to be used for transmission of data, and a case using quadrature amplitude modulation (QAM) will be described as an example.

Figure 2:
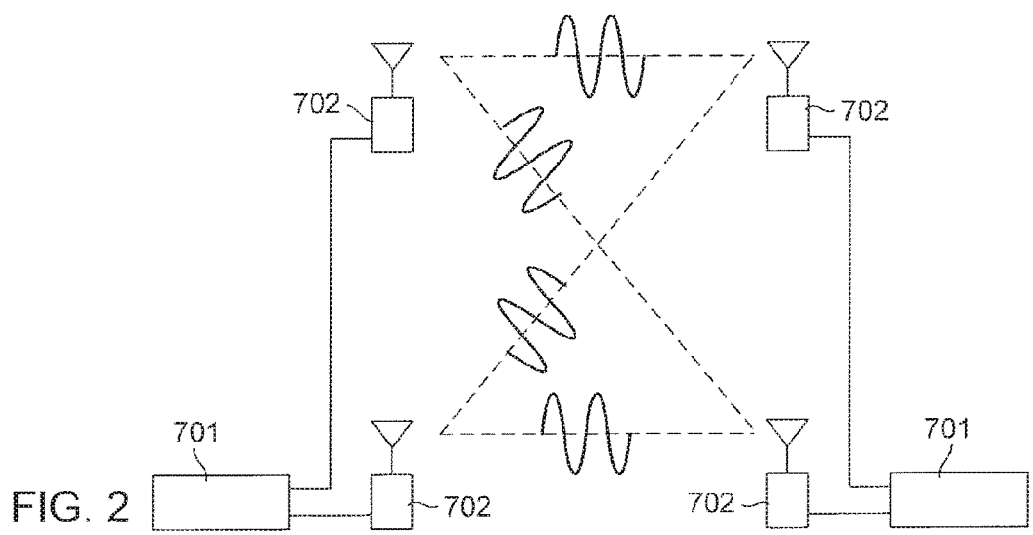
FIG. 2 is a block diagram showing a configuration of a 2×2 line-of-sight MIMO transmission system.
Figure 3:
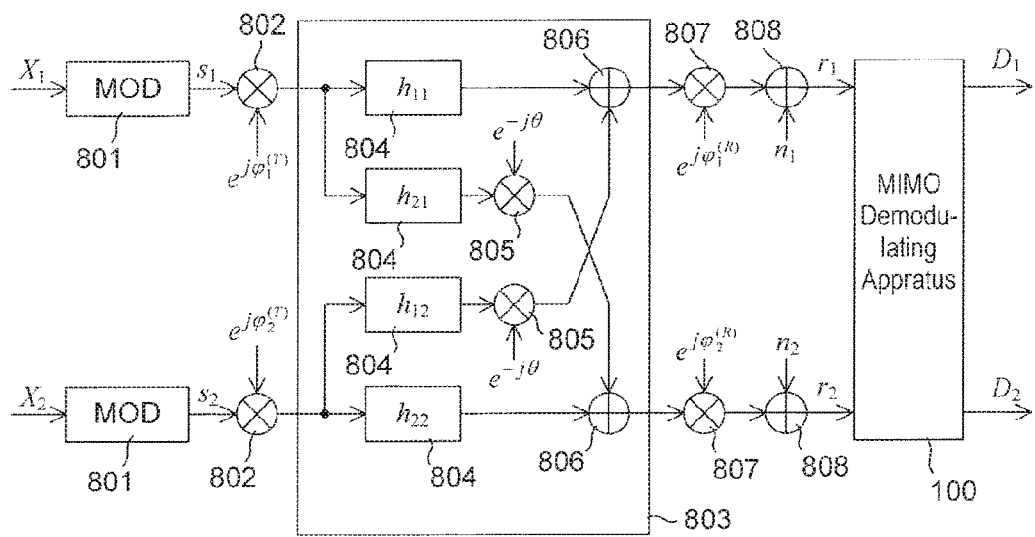
FIG. 3 is a block diagram showing one example of a baseband signal model of the transmission system shown in FIG. 2.

FIG. 2 shows a configuration of a line-of-sight MIMO wireless transmission system including two transmitting antennas and two receiving antennas. Each of the transmitting side and receiving side is formed of an indoor unit (IDU) 701 and outdoor units (ODU) 702 including antennas. Two outdoor units 702 are connected to indoor unit 701. FIG. 3 shows the modulation-demodulation processors provided in indoor unit 701, noise sources arising at outdoor units 702 and line-of-sight MIMO transmission channels in the form of a baseband signal model, and demonstrates the relationship between transmission data $X_1$, $X_2$ and the input signals to MIMO demodulating apparatus 100. In QAM scheme, when the number of signal points is $2^m$ (m is a positive integer), in modulator (MOD) 801 the transmission data stream to be transmitted is sectioned every m bits and m bits are mapped to one of $2^m$ points. The mapped signal point can be represented by a complex value, which will be called a transmitted signal.

Figure 4:
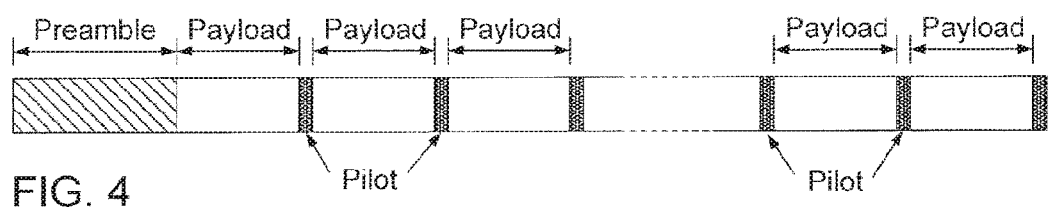
FIG. 4 is a diagram showing one example of the format of a transmitted signal.

FIG. 4 shows one example of a typical signal format of a transmitted signal frame. The signal format contains: a preamble that shows start of the frame and is used for capturing and establishing synchronization; pilot signals inserted at appropriate intervals as control signals; and payload parts corresponding to body of data to be transmitted. The content of the payload is unknown for the receiving side until the signal frame actually reaches the receiving side while the preamble and pilot signals are determined in advance between the transmitting and receiving sides. Hence the preamble and pilot signals are signals known to the receiving side. In the following description, known signals on the receiving side such as the preamble and the pilot signals will be called pilots. In the present exemplary embodiment, phase difference is corrected on the receiving side using the signals known to the receiving side, that is, the pilots. Accordingly, it is necessary to transmit the same pilot from the multiple antennas provided on the transmitting side. It is preferably that the pilots from the transmitting antennas are sent out at the same time. The following description will be made on the assumption that the transmitted signal supplied from each modulator 801 conforms to the format in FIG. 4. In the following description, two antennas on the transmitting side are called transmitting antennas #1, #2 and two antennas on the receiving side are called receiving antennas #1, #2.

When, in the baseband signal transmission model of FIG. 3, of two modulators 801 on the transmitting side the output signal sequence, i.e., the transmitted signal, transmitted from transmitting antenna #1 is denoted by $s_1$ and the output signal sequence transmitted from transmitting antenna #2 is denoted by $s_2$, received signal sequences $r_1$, $r_2$ to be the input to MIMO demodulating apparatus 100 can be given in matrix representation by the following Eq. (1). Received signal sequences $r_1$, $r_2$ are the received signals at receiving antenna #1 and receiving antenna #2, respectively.

$$\begin{bmatrix} r_1 \\ r_2 \end{bmatrix} = \begin{bmatrix} e^{j\varphi_1^{(R)}} & 0 \\ 0 & e^{j\varphi_2^{(R)}} \end{bmatrix} \begin{bmatrix} h_{11} & e^{-j\theta}h_{12} \\ e^{-j\theta}h_{21} & h_{22} \end{bmatrix} \begin{bmatrix} e^{j\varphi_1^{(T)}} & 0 \\ 0 & e^{j\varphi_2^{(T)}} \end{bmatrix} \begin{bmatrix} s_1 \\ s_2 \end{bmatrix} + \begin{bmatrix} n_1 \\ n_2 \end{bmatrix}. \quad (1)$$

Here, $\varphi_1^{(T)}$, $\varphi_2^{(T)}$ are phase noise caused by transmitting antennas #1, #2 and represented by phase rotators 802. $h_{11}$, $h_{21}$, $h_{12}$, $h_{22}$ denote impulse responses of four transmission paths 804 in MIMO transmission, $\theta$ denotes the phase rotation by the delay difference between the transmission paths and is represented by phase rotators 805. The path signals after addition at adder 806 are received by receiving antennas #1, #2 and affected by phase noise $\varphi_1^{(R)}$, $\varphi_2^{(R)}$. Phase noise $\varphi_1^{(R)}$, $\varphi_2^{(R)}$ is represented by phase rotators 807, similarly to the transmitting side. The received signals affected by the phase noise is affected by thermal noise, which is represented by addition of noise signals $n_1$, $n_2$ at adders 808. Received signal sequences $r_1$, $r_2$ thus expressed by Eq. (1) are supplied to MIMO demodulating apparatus 100. The role of MIMO demodulating apparatus 100 is to estimate transmitted signals $s_1$, $s_2$ from the given received signals $r_1$, $r_2$.

As shown in Eq. (1), when noise signals $n_1$, $n_2$ are neglected, received signals $r_1$, $r_2$ take a form of transmitted signals $s_1$, $s_2$ being successively multiplied from the left side by three matrixes. Accordingly, MIMO demodulating apparatus 100 performs procedures of removing the effects of the three matrixes in order, to estimate transmitted signals $s_1$, $s_2$. As shown in FIG. 1, MIMO demodulating apparatus 100 is generally formed of phase difference corrector 101, interference compensators 102 and phase noise compensators 103, which respectively perform procedures of removing the effect of the left end matrix having phase noise $\varphi_1^{(R)}$, $\varphi_2^{(R)}$ as its elements, the effect of the middle matrix representing interference as to the four transmission paths, and the effect of the right side matrix having phase noise $\varphi_1^{(T)}$, $\varphi_2^{(T)}$ as its elements, in Eq. (1).

Received signals $r_1$, $r_2$ supplied to MIMO demodulating apparatus 100 are supplied first to phase difference corrector 101. The received signals $r_1$, $r_2$ supplied to phase difference corrector 101 are assumed to the signals that are frequency-converted to the baseband after reception at the receiving antennas and further converted to digital signals by analog-to-digital conversion. However, frequency conversion to the baseband is not essential. In phase difference corrector 101, the influence of phase noise $\varphi_1^{(R)}$, $\varphi_2^{(R)}$ arising at the receiving antennas is suppressed. Now, details of phase difference corrector 101 will be described. To begin with, the above Eq. (1) can be rewritten as the following Eq. (2).

$$\begin{bmatrix} r_1 \\ r_2 \end{bmatrix} = \begin{bmatrix} e^{+j\Delta} & 0 \\ 0 & e^{-j\Delta} \end{bmatrix} \begin{bmatrix} h_{11} & e^{-j\theta}h_{12} \\ e^{-j\theta}h_{21} & h_{22} \end{bmatrix} \begin{bmatrix} e^{j\psi_1} & 0 \\ 0 & e^{j\psi_2} \end{bmatrix} \begin{bmatrix} s_1 \\ s_2 \end{bmatrix} + \begin{bmatrix} n_1 \\ n_2 \end{bmatrix}, \quad (2)$$

where $\Delta$, $\psi_1$, $\psi_2$ can be represented by the following Eqs. (3) and (4).

$$\Delta = \frac{(\varphi_1^{(R)} - \varphi_2^{(R)})}{2}, \quad (3)$$

$$\psi_1 = \varphi_1^{(T)} + \frac{(\varphi_1^{(R)} - \varphi_2^{(R)})}{2}, \psi_2 = \varphi_2^{(T)} + \frac{(\varphi_1^{(R)} - \varphi_2^{(R)})}{2}. \quad (4)$$

Phase difference corrector 101 receives input of received signals $r_1$, $r_2$, and estimates phase difference signal $\Delta$ shown in Eq. (3), which is an amount related to the difference of phase noise $\varphi_1^{(R)}$, $\varphi_2^{(R)}$ at the receiving antennas, to removes its effect. The output signals of phase difference corrector 101 are represented by $r_1'$, $r_2'$ shown in the following Eq. (5).

$$\begin{bmatrix} r_1' \\ r_2' \end{bmatrix} = \begin{bmatrix} e^{-j\Delta} & 0 \\ 0 & e^{+j\Delta} \end{bmatrix} \begin{bmatrix} r_1 \\ r_2 \end{bmatrix} = \begin{bmatrix} h_{11} & e^{-j\theta}h_{12} \\ e^{-j\theta}h_{21} & h_{22} \end{bmatrix} \begin{bmatrix} e^{j\psi_1} & 0 \\ 0 & e^{j\psi_2} \end{bmatrix} \begin{bmatrix} s_1 \\ s_2 \end{bmatrix} + \begin{bmatrix} n_1' \\ n_2' \end{bmatrix}, \quad (5)$$

where $n_1'$, $n_2'$ are signals obtained by rotating the phase of noise signals $n_1$, $n_2$ by $\Delta$, but can be regarded as the same noise signals as $n_1$, $n_2$, from a statistical viewpoint.

Figure 5:
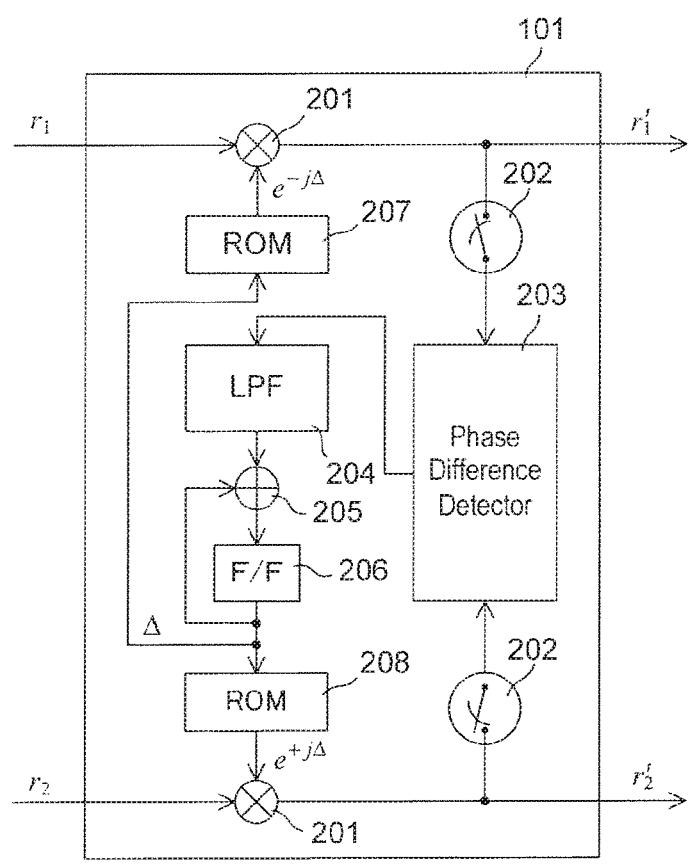
FIG. 5 is a block diagram showing one example of a configuration of a phase difference corrector.

FIG. 5 shows one example of a configuration of phase difference corrector 101. Phase difference corrector 101 includes: two phase rotators 201 that respectively rotate the phase of received signals $r_1$, $r_2$ to output phase corrected signals $r_1'$, $r_2'$; two switches 202; phase difference detector 203; low-pass filter (LPF) 204 supplied with the output of phase difference detector 203; adder 205; flip-flop (F/F) 206 connected to the output of adder 205; and two read-only memories (ROMs) 207, 208. Phase rotator 201 is also called a received signal phase rotator. Phase difference detector 203 is supplied with phase corrected signals $r_1'$, $r_2'$ through switches 202 respectively provided for phase corrected signals $r_1'$, $r_2'$ to detect the phase difference between these signals $r_1'$ and $r_2'$. Supplied to adder 205 are the output of low-pass filter 204 and the output of flip-flop 205. The output of flip-flop 206 is phase difference signal $\Delta$, which is supplied to adder 205 and also to ROMs 207, 208 as an address. ROMs 207, 208 store the values of $e^{-j\Delta}$, $e^{+j\Delta}$ corresponding to $\Delta$, in a table format. The outputs of ROMs 207, 208 are adapted to be given as input information to phase rotator 201 on the side of received signal $r_1$ and phase rotator 201 on the side of received signal $r_2$, respectively.

Next, the operation of this phase difference corrector 101 will be described. When phase difference signal $\Delta$ is assumed to be given to ROMs 207, 208, ROMs 207, 208 give $e^{-j\Delta}$, $e^{+j\Delta}$ to phase rotator 201 on the side of received signal $r_1$ and phase rotator 201 on the side of received signal side $r_2$, respectively. As a result, of received signals $r_1$, $r_2$ supplied to phase difference corrector 101, phase rotator 201, which is configured as complex multipliers, subjects signal $r_1$ to a phase rotation of $-\Delta$ to generate signal $r_1'$. Similarly, phase rotator 201 subjects signal $r_2$ to a phase rotation of $+\Delta$ to generate signal $r_2'$. At the same time of output of phase corrected signals $r_1'$, $r_2'$, phase difference signal $\Delta$ is updated. Update of phase difference signal $\Delta$ is performed based on an identical pilot (the known signals on the MIMO demodulating apparatus side such as the pilot signals, preamble etc.) transmitted from the two antennas on the transmitting side. Switch 202 becomes turned on at the time when the pilot part in the transmission format of the received signal is received. As a result, phase difference detector 203 detects the phase difference between signals $r_1'$ and $r_2'$ in the pilot part and outputs the detected phase difference. The signal representing the phase difference delivered from phase difference detector 203 is passed through low-pass filter 204 so that high frequency component is removed, and then added at adder 205 to the previous phase difference signal Δ held in flip-flop 206, and the signal after addition is held again in flip-flop 206. Thus, phase difference signal Δ is updated. Phase difference signal Δ held at flip-flop 206 is passed through ROMs 207, 208 to be converted into input information to phase rotators 201, whereby the phase rotating process of received signals $r_1$, $r_2$ is performed as described above. The above is the operation of phase difference corrector 101.

Interference compensators 102 are devices that remove interference involved with the four paths in the 2×2 MIMO transmission channels from the output signals of phase difference corrector 101, i.e., phase compensated signals $r_1'$, $r_2'$. The output signals of interference compensators 102, or the desired signals, correspond to $u_1$, $u_2$ shown in the following Eq. (6). In Eq. (6), $\xi_1$, $\xi_2$ represent noise signals. Interference compensators 102 are configured to minimize the noise signals.

$$\begin{bmatrix} u_1 \\ u_2 \end{bmatrix} = \begin{bmatrix} e^{j\psi_1}s_1 \\ e^{j\psi_2}s_2 \end{bmatrix} + \begin{bmatrix} \xi_1 \\ \xi_1 \end{bmatrix}. \tag{6}$$

Figure 6:
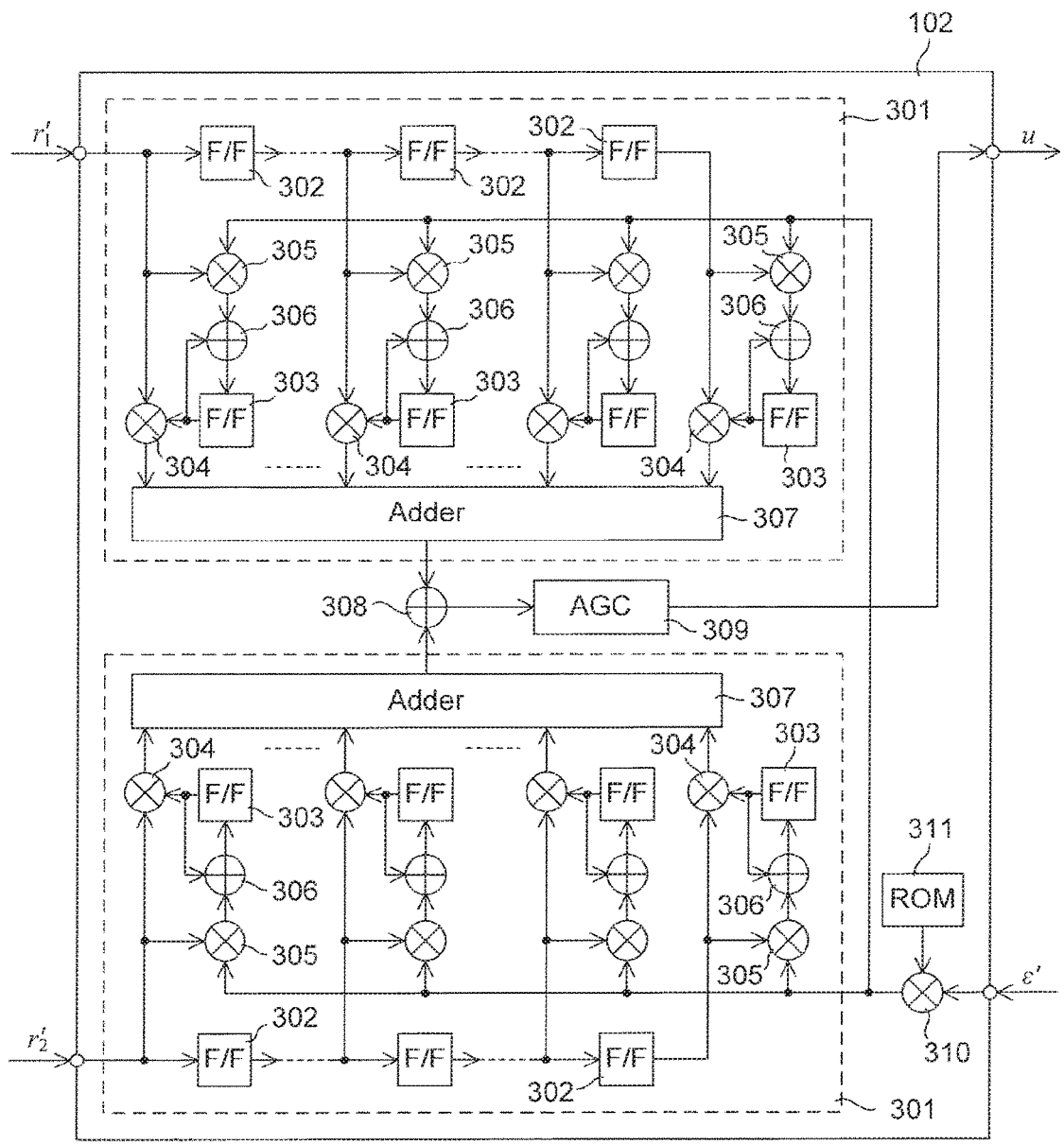
FIG. 6 is a block diagram showing one example of a configuration of an interference compensator in the apparatus shown in FIG. 1.

FIG. 6 shows one example of a configuration of interference compensator 102. Interference compensator 102 shown in the drawing includes: two LMS (Least Mean Square) equalizers 301 receiving supply of phase compensated signals $r_1'$, $r_2'$, respectively; adder 308 for adding the outputs of two LMS adders 301; automatic gain controller (AGC; Automatic Gain Control) unit 309 to which the output of adder 308 is supplied; multiplier 310; and ROM 311 storing constants. The output of AGC unit 309 forms the output signal of this interference compensator 102. As to the interference compensator on the side of output data $D_1$ in the configuration shown in FIG. 1, this interference compensator 102 outputs signal $u_1$. As to the interference compensator on the side of output data $D_2$, this interference compensator 102 outputs signal $u_2$. In FIG. 6, the output signal is denoted with u without distinguishing between signals $u_1$ and $u_2$. Interference compensator 102 also receives supply of the phase compensated error signal from phase rotator 105 in order to update the tap coefficients in two LMS equalizers 301. The phase compensated error signal supplied to the interference compensator on the side of output data $D_1$ is signal $\varepsilon_1'$ while the phase compensated error signal supplied to the interference compensator on the side of output data $D_2$ is signal $\varepsilon_2'$. Both the error signals are denoted with ε' when these signals are not distinguished. This error signal ε' is multiplied at multiplier 310 by a constant stored in ROM 311, and the error signal after multiplication is supplied to each LMS equalizer 301. The configuration of LMS equalizer 301 and setting of the constant in ROM 311 will be described later.

In this interference compensator 102, signal $r_1'$ from phase difference corrector 101 is supplied to one of LMS equalizers 301 and signal $r_2'$ is supplied to the other LMS equalizers 301. The output signals from these two LMS equalizers are added at adder 308, and the sum is supplied to AGC unit 309, where the output signal is adjusted and output so that the average of the output signal level falls within a predetermined range.

Next, the configuration of LMS equalizer 301 will be described. LMS equalizer 301 is a transversal filter added with a function of updating its tap coefficients, and includes a plurality of flip-flops 302 connected in series to delay the input signal as well as including, for each of the inputs of plural flip-flops 302 and the output of the flip-flop at the last stage, flip-flop 303 for holding a tap coefficient, multiplier 304 for multiplying the delayed input signal with the tap coefficient, multiplier 305 and adder 306 for updating the tap coefficient. Supplied to multiplier 305 are the delayed input signal and the error signal. Adder 306 multiplies the output of flip-flop 303 and the output of multiplier 305 and stores the result into flip-flop 303. LMS equalizer 301 in this exemplary embodiment operates in the same manner as an ordinary LMS equalizer, and uses the output of multiplier 310 for the error signal to update the tap coefficient. Accordingly, the two LMS equalizers in interference compensator 102 shown in FIG. 6 use a common error signal.

As shown in FIG. 1, since MIMO demodulating apparatus 100 of the present exemplary embodiment includes two interference compensators 102 each including two LMS equalizers 301, the MIMO demodulating apparatus includes four LMS equalizers 301 in total. The optimal values of the tap coefficients of these four LMS equalizers 301 will be described, then the tap coefficients used in LMS equalizer 301 and the value to be stored in ROM 311 and used for updating the tap coefficients will be described.

When the optimal tap coefficients that minimize the mean square error for respective four LMS equalizers 301 are denoted as $w_{11}^o$, $w_{12}^o$, $w_{21}^o$, $w_{22}^o$, these satisfy the following Eq. (7).

$$\begin{bmatrix} w_{11}^o & w_{12}^o \\ w_{21}^o & w_{22}^o \end{bmatrix} = \left( H^\dagger H + \frac{2\sigma^2}{P}I \right)^{-1} H^\dagger, \tag{7}$$

where P is transmission power, $\sigma^2$ is the variance of each of noise signals $n_1$, $n_2$ in Eq. (1), and I represents the unit matrix. Matrix H is represented by the following Eq. (8). Here, $A^\dagger$ represents the Hermitian transposed matrix of matrix A.

$$H = \begin{bmatrix} h_{11} & e^{-j\theta}h_{12} \\ e^{-j\theta}h_{21} & h_{22} \end{bmatrix}. \tag{8}$$

When the tap coefficients of four LMS equalizers 301 are written as $w_{11}$, $w_{12}$, $w_{21}$, $w_{22}$, four LMS equalizers 301 update these tap coefficients as in the following Eq. (9) by use of error signals $\varepsilon_1$, $\varepsilon_2$ supplied to two interference compensators 102.

$$\begin{bmatrix} w_{11} & w_{12} \\ w_{21} & w_{22} \end{bmatrix} \leftarrow \begin{bmatrix} w_{11} & w_{12} \\ w_{21} & w_{22} \end{bmatrix} + \mu \begin{bmatrix} \varepsilon_1 r_1'^\dagger & \varepsilon_1 r_2'^\dagger \\ \varepsilon_2 r_1'^\dagger & \varepsilon_2 r_2'^\dagger \end{bmatrix}, \tag{9}$$

where μ is a numeric value that is held in ROM 311 and set so as to suffice the following inequality (Eq. (10)).

$$0 < \mu < \frac{2}{\lambda_m}, \tag{10}$$

where $\lambda_m$ is the maximum Eigen value of $(P/2)HH^\dagger + \sigma^2 I$.

When, for example, the tap coefficients other than the center taps of $w_{11}$, $w_{12}$, $w_{21}$, $w_{22}$ are set at zero as the initial value of each tap coefficient, and the coefficients of the center taps set at 1, $-e^{-j\theta}$, $-e^{-j\theta}$ and 1, the tap coefficients respectively approach $w_{11}^0$, $w_{12}^0$, $w_{21}^0$, $w_{22}^0$ in Eq. (7) by iterating the updating process of Eq. (9) when the accuracy of the error signal is high enough. As a result, adaptive control in interference compensators 102 is implemented, so that it is possible to easily perform an interference compensation process without direct calculation of Eq. (7) which includes derivation of the inverse matrix. The above is the procedure of updating tap coefficients relating to four LMS equalizers 301 in interference compensators 102.

As shown in FIG. 1, MIMO demodulating apparatus 100 includes two phase noise compensators 103. The phase noise compensator 103 provided on the side of output data $D_1$ receives desired signal $u_1$ supplied from interference compensator 102 and removes phase error $\psi_1$ shown in Eq. (4) to output signal $u_1'$. Further, this phase noise compensator 103 outputs phase error $\psi_1$ to phase rotator 105 in order to compensate for phase error of error signal $\varepsilon_1$. Similarly, the phase noise compensator 103 provided on the side of output data $D_2$ side desired signal $u_2$ supplied from interference compensator 102 and removes phase error $\psi_2$ to output signal $u_2'$, and also outputs phase error $\psi_2$ to phase rotator 105 in order to compensate for phase error of error signal $\varepsilon_2$. Signals $u_1'$, $u_2'$ are given by Eq. (11).

$$\begin{bmatrix} u_1' \\ u_2' \end{bmatrix} = \begin{bmatrix} s_1 \\ s_2 \end{bmatrix} + \begin{bmatrix} \xi_1' \\ \xi_2' \end{bmatrix}. \quad (11)$$

Herein, $\xi_1'$, $\xi_2'$ are the signals that are obtained by rotating noise signals $\xi_1$, $\xi_2$ in Eq. (6) by $-\psi_1$ and $-\psi_2$, respectively, but can be regarded as the same noise signals as $\xi_1$, $\xi_2$ from a statistical viewpoint.

Figure 7:
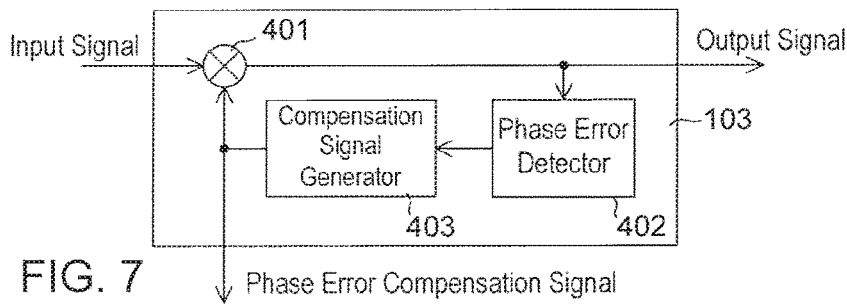
FIG. 7 is a block diagram showing one example of a configuration of a phase noise compensator.

FIG. 7 shows one example of a configuration of phase noise compensator 103. Phase noise compensator 103 includes: phase rotator 401 that is supplied with an input signal and performs a phase rotating process on the input signal to output the rotated signal as an output signal; phase error detector 402 that detects a phase error in the output signal; and compensation signal generator 403 for generating a phase error compensation signal based on the detected value at phase error detector 402. Phase rotator 401 is also called a desired signal phase rotator. The phase error compensation signal is supplied to the outside and also given to inform the phase rotation amount to phase rotator 401. The configuration and operation of this phase noise compensator 103 is the same as that of an ordinary phase looked loop (PLL). That is, the phase noise compensator receives the output signal from interference compensator 102 and outputs the signal with its phase error corrected by phase rotator 401. The output signal is supplied to phase error detector 402 at the same time of output thereof. Phase error detector 402 calculates the phase difference between the input signal and the closest transmitted signal and supplies the phase difference to compensation signal generator 403. Compensation signal generator 403 generates a phase error compensation signal by removing high-frequency component of the input signal and cumulatively adding the result. The thus generated phase error compensation signal is supplied to phase rotator 401 and also used as information on the phase error to generate error signal $\varepsilon'$ to be supplied to interference compensator 102. In order to detect the phase difference, phase error detector 402 needs the transmitted signal which is closest to the input signal. This can be done, for example, by quantizing the input signal before the phase rotating process at phase rotator 401 and calculating the transmitted signal closest to the quantized input signal.

As shown in FIG. 1, MIMO demodulating apparatus 100 includes two signal determiners 104. Signal determiner 104 receives the output signal from phase noise compensator 103 and outputs data corresponding to the transmitted signal closest to the input signal. The calculation of the transmitted signal closest to the input signal is carried out, if, for example, a QAM-modulated signal is received as the received signal, by quantizing the input signal for each signal component of in-phase and orthogonal signal components and calculating the transmitted signal closest to the quantized input signal. At the same time, signal determiner 104 outputs the difference between the input signal and the transmitted signal closest to the input signal as an error signal. Accordingly, the signal determiner 104 corresponding to output data $D_1$ receives signal $u_1'$ as input and outputs $\varepsilon_1$ as an error signal. Similarly, the signal determiner 104 corresponding to output data $D_2$ receives signal $u_2'$ and outputs $\varepsilon_2$ as an error signal.

The error signal supplied from signal determiner 104 is subjected to a phase rotating process based on the phase error compensation signal by phase rotator 105 to be the error signal for LMS equalizer 301 in interference compensator 102. The phase rotation amount at phase rotator 105 is set at a value obtained by multiplying the phase rotation amount in phase rotator 401 in phase noise compensator 103 by −1. In one word, when the phase rotation amount at phase rotator 401 in phase noise compensator 103 is $\psi$, the phase rotation amount at phase rotator 105 is set at $-\psi$.

Figure 8:
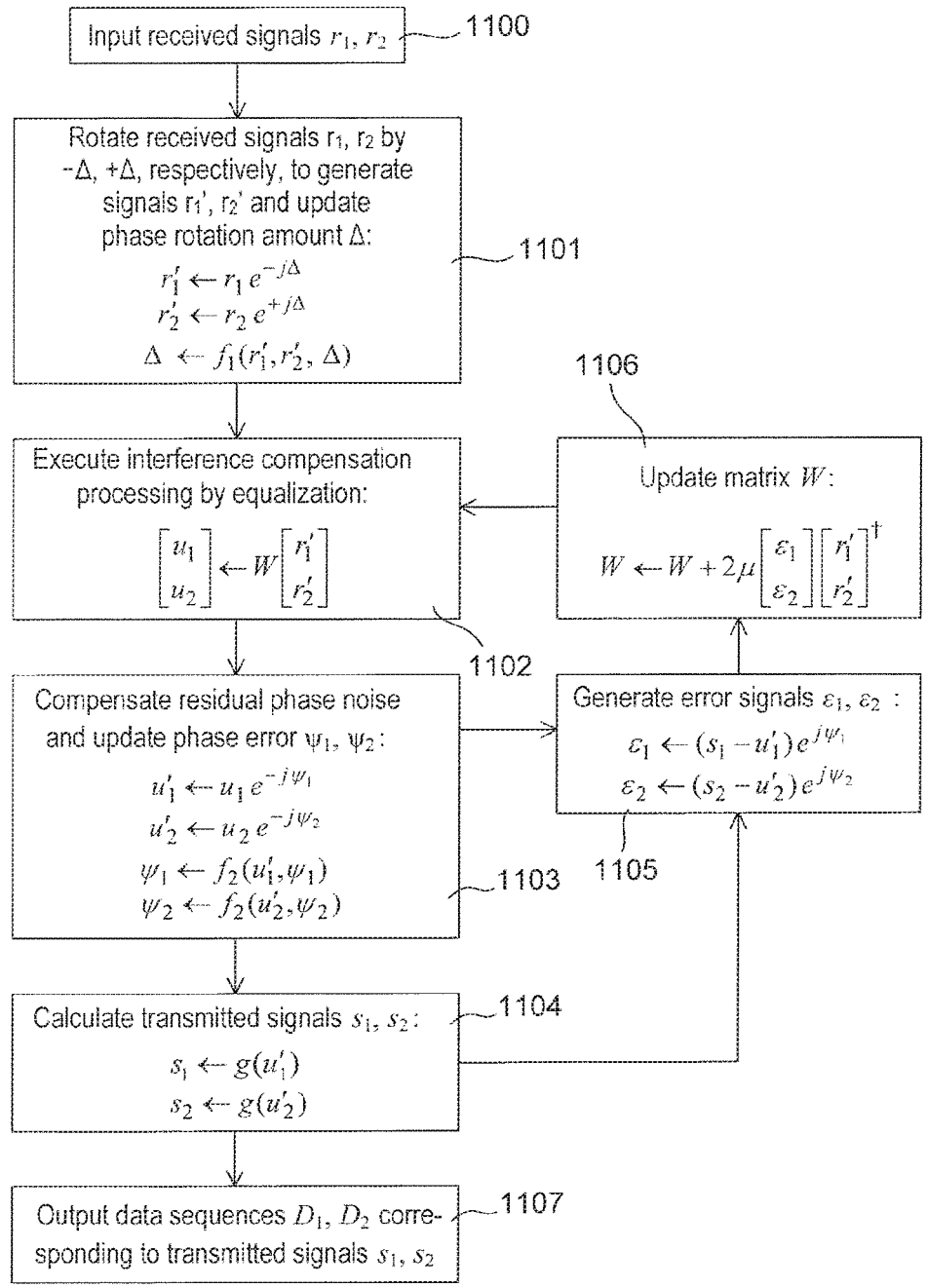
FIG. 8 is a diagram for illustrating a demodulating process in the MIMO demodulating apparatus shown in FIG. 1.

FIG. 8 shows the relationship between processing steps in the processing sequence of line-of-sight MIMO demodulation implemented by MIMO demodulating apparatus 100 in the first exemplary embodiment. In the drawing, the arrows show the flows of signals and parameters between processing steps.

MIMO demodulating apparatus 100 is supplied with received signals $r_1$, $r_2$, as shown at Step 1100. Then, at Step 1101, the phase of received signals $r_1$, $r_2$ is rotated by $-\Delta$, $+\Delta$, respectively, and, based on the resultant signals $r_1'$, $r_2'$ and $\Delta$, the numeric value of phase rotation amount $\Delta$ is updated. Function $f_1$ in the box showing Step 1101 expresses the effect of phase difference corrector 101 by a function. Next, at Step 1102, MIMO demodulating apparatus 100 performs an interference compensation process by equalization so as to calculate signals $u_1$, $u_2$ from signals $r_1'$, $r_2'$. This equalization process corresponds to a process of multiplying the signals by matrix W having tap coefficients $w_{11}^0$, $w_{12}^0$, $w_{21}^0$, $w_{22}^0$ as its elements, as shown in Step 1102. MIMO demodulating apparatus 100 compensates for residual phase noise by rotating the phase of signals $u_1$, $u_2$ by $-\psi_1$, $-\psi_2$, respectively to calculate signals $u_1'$, $u_2'$ at Step 1103. Also, based on the obtained signals $u_1'$, $u_2'$ and $\psi_1$, $\psi_2$, the numeric values of $\psi_1$, $\psi_2$, are updated. Function $f_2$ in the box showing Step 1103 expresses the effect of phase error detector 402 and compensation signal generator 403 in phase noise compensator 103, by a function.

At Step 1104 MIMO, demodulating apparatus 100 calculates the closest transmitted signals $s_1$, $s_2$ from signals $u_1'$, $u_2'$, respectively. Function g in the box showing Step 1104 expresses the effect of calculating transmitted signals $s_1$, $s_2$ in signal determiner 104 by a function. Demodulating apparatus 100 outputs data sequences corresponding to transmitted signals $s_1$, $s_2$ as output data $D_1$, $D_2$ at Step 1107, and at the same time, generates error signals $\varepsilon_1$, $\varepsilon_2$ at Step 1105.

Then demodulating apparatus 100 updates, at Step 1106, matrix W to be used for equalization in Step 1102 using Eq. (9) with error signals $\varepsilon_1$, $\varepsilon_2$. Thereafter, the same loop of deriving output data $D_1$, $D_2$ by estimating transmitted signals $s_1$, $s_2$ from supplied received signals $r_1$, $r_2$ is iterated.

In MIMO demodulating apparatus 100 of the present exemplary embodiment, phase difference corrector 101, interference compensators 102, phase noise compensators 103, signal determiners 104 and phase rotators 105 can be configured by hardware components. Alternatively, a computer program that causes a computer to execute the steps from Steps 1100 to 1107 shown in FIG. 8 may be prepared and loaded on the memory of the computer so that the CPU (Central Processing Unit) of the computer can run the program to realize MIMO demodulating apparatus 100. When the MIMO demodulating apparatus is realized by a program or software, the program is loaded into a computer via some recording medium or via a network. Accordingly, a non-transitory and computer-readable recording medium storing such a program may and should be included in the scope of the present invention. Alternatively, some of phase difference corrector 101, interference compensators 102, phase noise compensators 103, signal determiners 104 and phase rotators 105 may be configured by hardware while the others may be realized as functional components by software.

Figure 9:
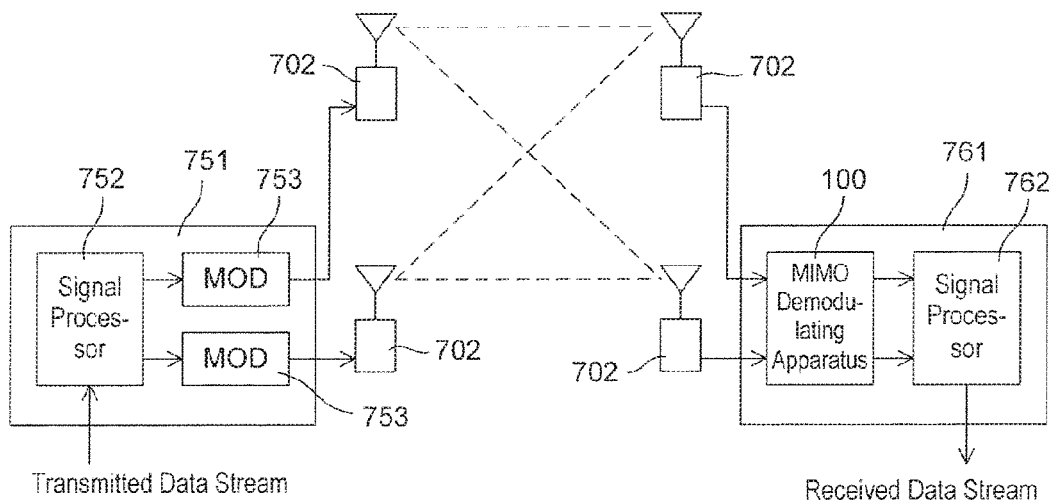
FIG. 9 is a block diagram showing one example of a configuration of a MIMO communications system including the MIMO demodulating apparatus shown in FIG. 1.

FIG. 9 shows a 2×2 line-of-sight MIMO communications system including MIMO demodulating apparatus 100 of the present exemplary embodiment. Provided on the transmitting side are: indoor unit 751; and two outdoor units 702 including transmitting antennas and connected to indoor unit 751, which form a transmitter. Indoor unit 751 includes: signal processor 752 that effects a demultiplexing process of splitting the input transmission data stream into two data streams and other processes; and modulators (MOD) 753 each provided for one of the two split data streams. The transmitted signals are modulated by two modulators 753 and transmitted from two outdoor units 702, respectively, to the receiving side. Provided on the receiving side are: indoor unit 761; and two outdoor units 702 including receiving antennas and connected to indoor unit 761, which form a receiver. Indoor unit 761 is comprised of: MIMO demodulating apparatus 100 of the present embodiment, supplied with received signals from two outdoor units; 702 and signal processor 762 that effects a multiplexing process of generating a received data stream by combining two output data sequence from MIMO demodulating apparatus 100 and other processes. Indoor unit 761 outputs the received data stream from signal processor 762.

Figure 10:
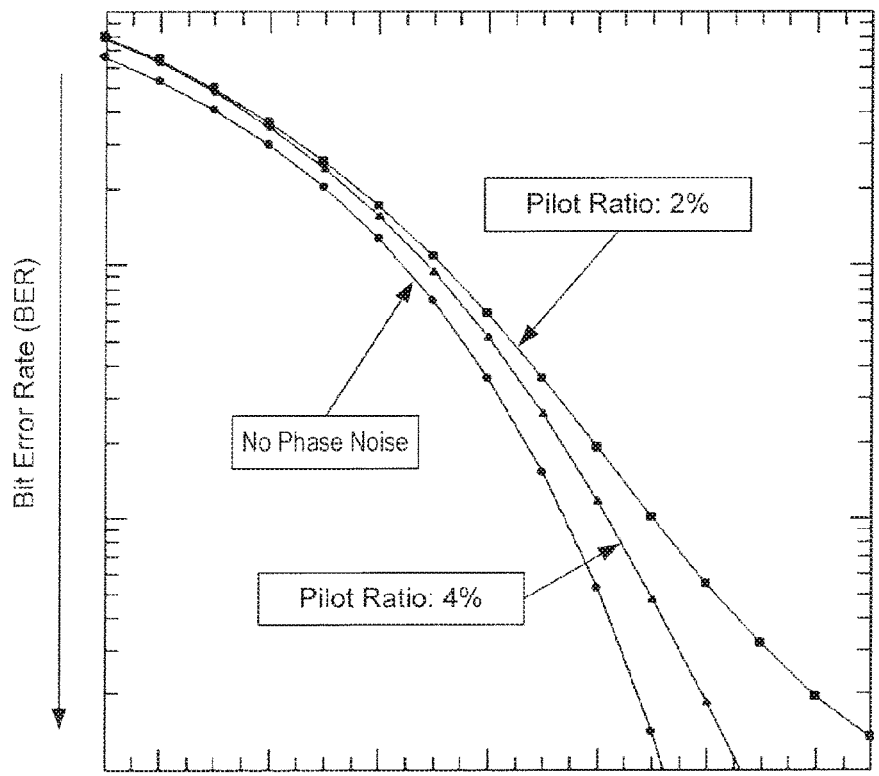
FIG. 10 is a graph showing error rate characteristic when 256-QAM transmission is performed using a line-of-sight MIMO demodulating method based on the first exemplary embodiment.

FIG. 10 is a graph showing the relationship between carrier-to-noise power ratio (CNR; Carrier-to-Noise Ratio) and bit error rate (BER) when 256-QAM transmission is performed using MIMO demodulating apparatus 100 of the present embodiment. The transverse axis represents CNR in the decibel (dB) scale while the vertical axis represents BER using a common logarithm scale. In FIG. 10, the black dot marks represent reference data for comparison, showing the relationship between CNR and BER in an ideal environment where there is not any phase noise $\varphi_1^{(T)}$, $\varphi_2^{(T)}$, $\varphi_1^{(R)}$, $\varphi_2^{(R)}$ on the transmitting and receiving sides, in the transmission model shown in FIG. 3. In FIG. 10, black triangular and black square marks show the relationships between CNR and BER when the noise level for each phase noise source at the frequency 100 kHz apart from the center frequency is −100 dBc/Hz. Here, the symbol rate is 24 MHz. The black triangles show a case where the occupying ratio of the pilot in the transmission frame shown in FIG. 4 in terms of duration is 4% and the black squares shows a case where the ratio is 2%. As the pilot signal, one symbol of a QPSK signal that presents the same average power as 256-QAM was used. The transmission frame was provided with no preamble.

When MIMO demodulating apparatus 100 based on the present embodiment was not used, it was difficult to collect statistical data as shown in FIG. 10 because out-of-phase synchronization frequently occurred under the same communication conditions so that stable signal transmission could not be expected. When MIMO demodulating apparatus 100 of the present embodiment is used, with a pilot signal rate of 2 to 4% that will little affect communication capacity, little difference from the ideal state is found in the practically significant range of BER=0.1 to 1.0%, so that it is possible to perform high-quality data transmission. Though not shown in FIG. 10 for easy-to-see purposes, the behavior at a pilot signal rate of 10% overlaps the black dot marks or the ideal state free from phase noise, little degradation is found in the range shown in FIG. 10.

Figure 11:
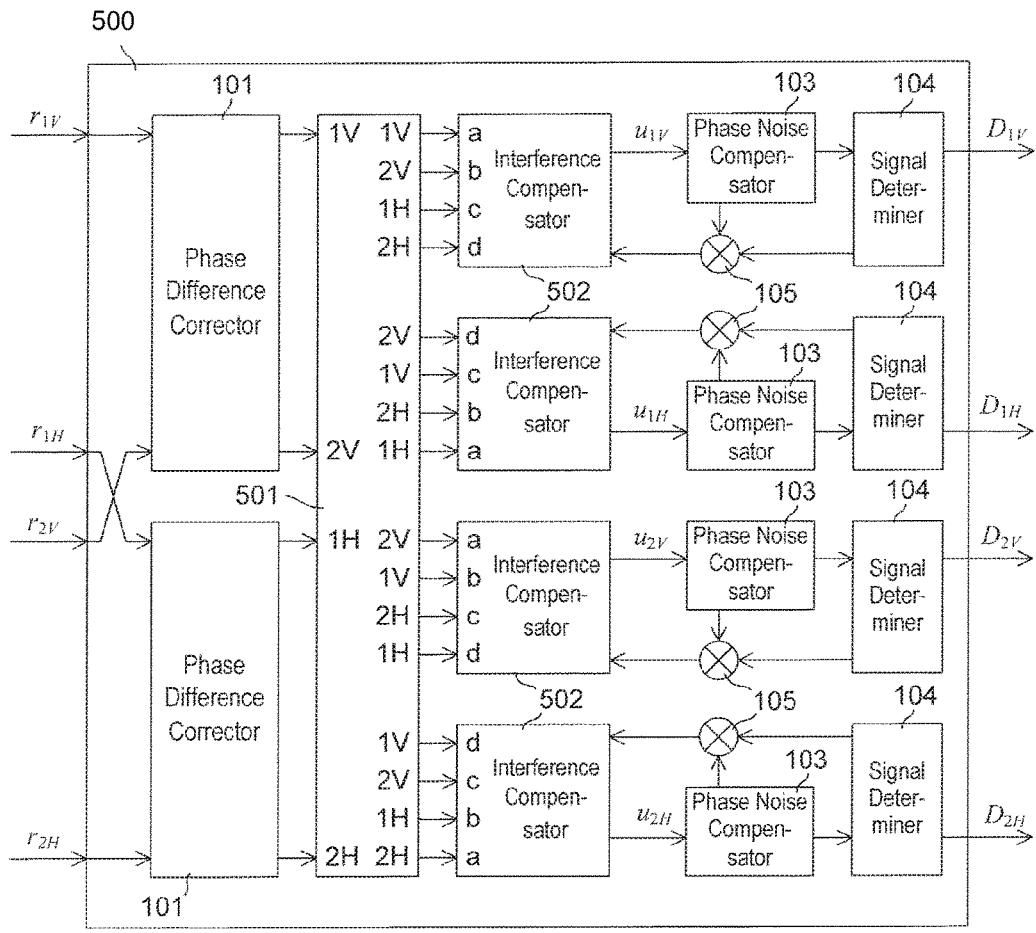
FIG. 11 is a block diagram showing a configuration of a line-of-sight MIMO demodulating apparatus according to a second exemplary embodiment of the present invention.

Although the above described MIMO demodulating apparatus 100 of the first exemplary embodiment is applied to a transmission system having no consideration of polarization, the present invention can be applied to a line-of-sight MIMO communications using polarization multiplexing. MIMO demodulating apparatus 500 according to a second exemplary embodiment of the present invention shown in FIG. 11 is used in a polarization multiplexing 2×2 line-of-sight MIMO communications. Description herein will be made by taking a case where communication is performed by linear polarization multiplexing using vertically polarized waves shown by a subscript V and horizontally polarized waves shown by a subscript H as the polarization components in polarization multiplexing. However, MIMO demodulating apparatus 500 of the present embodiment can be applied to cases where communication is performed based on circular polarization multiplexing using right-handed and left-handed polarized wave components.

MIMO demodulating apparatus 500 is an apparatus that is used in a line-of-sight MIMO system (see FIG. 12) in which horizontally- and vertically-multiplexed sequences are transmitted from each of two transmitting antennas, i.e., in total four independent data sequences are transmitted while the transmitted signals are received by two receiving antennas that can receive the signals separated into the horizontal and vertical components. MIMO demodulating apparatus 500 is an apparatus that recovers the original four transmitted sequences of data from vertically-polarized component received signals $r_{1V}$, $r_{2V}$ and horizontally-polarized component received signals $r_{1H}$, $r_{2H}$ obtained through the two receiving antennas to give output data $D_{1V}$, $D_{2V}$, $D_{1H}$, $D_{2H}$. MIMO demodulating apparatus 500 includes: two phase difference correctors 101; interconnection network 501; four interference compensators 502; four phase noise compensators 103; four signal determiners 104; and four phase rotators 105. Phase noise compensator 103, signal determiner 104 and phase rotator 105 are the same as those described in the first exemplary embodiment, and provided for each of output data $D_{1V}$, $D_{1H}$, $D_{2V}$, $D_{2H}$.

Phase difference corrector 101 is also the same as that described in the first exemplary embodiment, but one of phase difference correctors 101 corresponds the vertically-polarized component, is supplied with received signals $r_{1V}$, $r_{2V}$ and performs correction to phase difference between these received signals to output signals $r_{1V}'$, $r_{2V}'$. The other phase difference corrector 101 corresponds the horizontally-polarized component, is supplied with received signals $r_{1H}$, $r_{2H}$ and performs correction to phase difference between these received signals to output signals $r_{1H}'$, $r_{2H}'$. Four interference compensators 502 are also provided for four output data $D_{1V}$, $D_{1H}$, $D_{2V}$, $D_{2H}$ and output desired signals $u_{1V}$, $u_{1H}$, $u_{2V}$, $u_{2H}$, respectively. When output signals $u_{1V}$, $u_{1H}$, $u_{2V}$, $u_{2H}$ from four interference compensators 502 are not distinguished therebetween, these are denoted by output signals u. Interconnection network 501 is disposed between two phase difference correctors 101 and four interference compensators 502. Each interference compensator 502 has four input terminals a to d, and interconnection network 501 distributes signals $r_{1V}'$, $r_{2V}'$, $r_{1H}'$, $r_{2H}'$, from two phase difference correctors 101 to each interference compensator 502. In the drawing, the letters written for each output of interconnection network 501 represent which polarized component of which receiving antenna appears the corresponding output.

Figure 12:
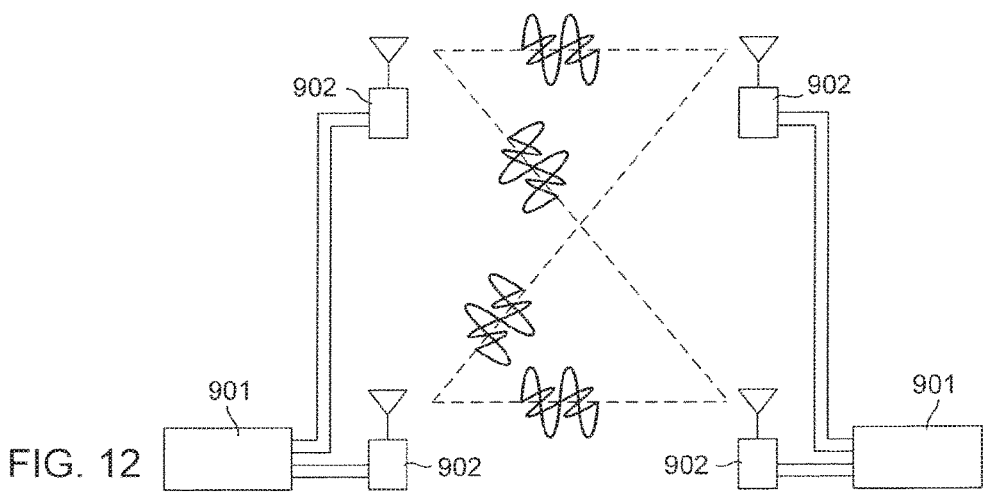
FIG. 12 is a block diagram showing a configuration of a polarization multiplexing 2×2 line-of-sight MIMO transmission system.
Figure 13:
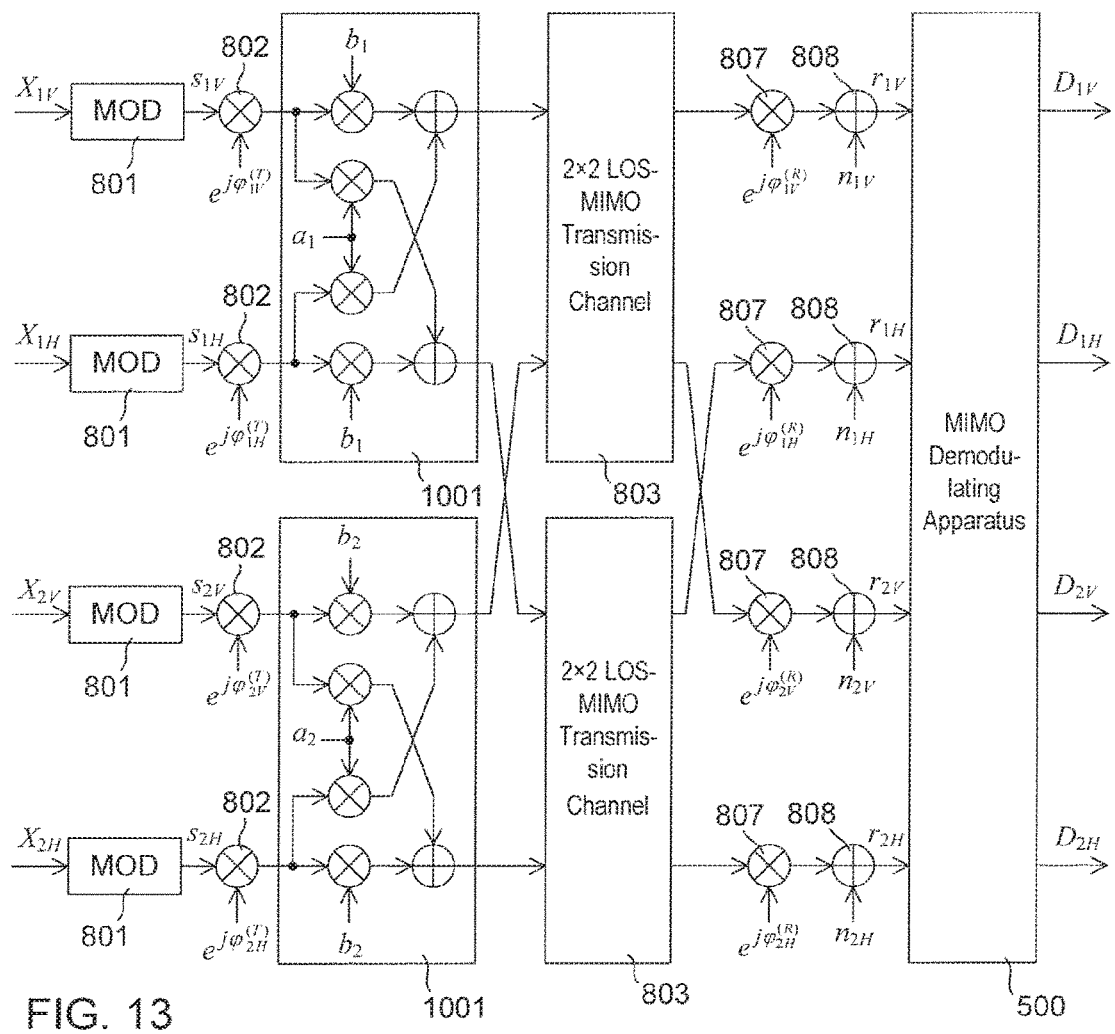
FIG. 13 is a block diagram showing one example of a baseband signal model of the transmission system shown in FIG. 12.

FIG. 12 shows a configuration of a polarization multiplexing line-of-sight MIMO wireless transmission system including two transmitting antennas and two receiving antennas. Each of the transmitting side and receiving side is formed of: an indoor unit 901; and outdoor units 902 including polarization multiplexing antennas. Two outdoor units 902 are connected to indoor unit 901. FIG. 13 shows the modulation/demodulation processor included in indoor unit 901, noise sources arising at outdoor units 902, interference between different polarizations in polarization multiplexing transmission and line-of-sight MIMO transmission channels by means of a baseband signal transmission model. FIG. 13 demonstrates the relationship between transmission data and the input signals to MIMO demodulating apparatus 500. In the baseband signal transmission model of FIG. 13, the signal sequence of vertical polarization transmitted from transmitting antenna #1 is denoted by $s_{1V}$, the signal sequence of horizontal polarization transmitted from transmitting antenna #1 is denoted by $s_{1H}$, the signal sequence of vertical polarization transmitted from transmitting antenna #2 is denoted by $s_{2V}$, the signal sequence of horizontal polarization transmitted from transmitting antenna #2 is denoted by $s_{2H}$. Here, signal sequences $s_{1V}$, $s_{1H}$, $s_{2V}$, $s_{2H}$ are generated from transmitted data $X_{1V}$, $X_{1H}$, $X_{2V}$, $X_{2H}$ with modulation by modulators (MOD) 801, respectively. The signal sequence of vertical polarization received at receiving antenna #1 is denoted by $r_{1V}$, the signal sequence of horizontal polarization received at receiving antenna #1 is denoted by $r_{1H}$, the signal sequence of vertical polarization received at receiving antenna #2 is denoted by $r_{2V}$, the signal sequence of horizontal polarization received at receiving antenna #2 is denoted by $r_{2H}$. Four received signal sequences $r_{1V}$, $r_{1H}$, $r_{2V}$, $r_{2H}$ to be the input to MIMO demodulating apparatus 500 can be given in matrix representation by the following Eq. (12).

$$\begin{bmatrix} r_{1V} \\ r_{1H} \\ r_{2V} \\ r_{2H} \end{bmatrix} = \Phi^{(R)} H_{DP} \Phi^{(T)} \begin{bmatrix} s_{1V} \\ s_{1H} \\ s_{2V} \\ s_{2H} \end{bmatrix} + \begin{bmatrix} n_{1V} \\ n_{1H} \\ n_{2V} \\ n_{2H} \end{bmatrix}, \quad (12)$$

where, $n_{1V}$, $n_{1H}$, $n_{2V}$, $n_{2H}$ represent noise signals arising from thermal noise, $H_{DP}$, $\Phi^{(T)}$, $\Phi^{(R)}$ are the matrixes shown in the following Eq. (13), Eq. (14) and Eq. (15), representing polarization multiplexing MIMO transmission channels, transmitting side phase noise and receiving side phase noise, respectively.

$$H_{DP} = \begin{bmatrix} h_{11}^V b_1 & h_{11}^V a_1 & e^{-j\theta} h_{12}^V b_2 & e^{-j\theta} h_{12}^V a_2 \\ h_{11}^H a_1 & h_{11}^H b_1 & e^{-j\theta} h_{12}^H a_2 & e^{-j\theta} h_{12}^H b_2 \\ e^{-j\theta} h_{21}^V b_1 & e^{-j\theta} h_{21}^V a_1 & h_{22}^V b_2 & h_{22}^V a_2 \\ e^{-j\theta} h_{21}^H a_1 & e^{-j\theta} h_{21}^H b_1 & h_{22}^H a_2 & h_{22}^H b_2 \end{bmatrix}, \quad (13)$$

$$\Phi^{(T)} = \begin{bmatrix} e^{j\varphi_{1V}^{(T)}} & & & \\ & e^{j\varphi_{1H}^{(T)}} & & \\ & & e^{j\varphi_{2V}^{(T)}} & \\ & & & e^{j\varphi_{2H}^{(T)}} \end{bmatrix}, \quad (14)$$

$$\Phi^{(R)} = \begin{bmatrix} e^{j\varphi_{1V}^{(R)}} & & & \\ & e^{j\varphi_{1H}^{(R)}} & & \\ & & e^{j\varphi_{2V}^{(R)}} & \\ & & & e^{j\varphi_{2H}^{(R)}} \end{bmatrix}. \quad (15)$$

In Eq. (13), $h_{11}^V$, $h_{21}^V$, $h_{12}^V$, $h_{22}^V$ denote impulse responses of the transmission paths through MIMO transmission channels 803 for vertical polarization, whereas $h_{11}^H$, $h_{21}^H$, $h_{12}^H$, $h_{22}^H$ denote impulse responses of the transmission paths through MIMO transmission channels 803 for horizontal polarization. θ denotes phase rotation by the delay difference between transmission paths. Further, $a_1$ and $b_1$ represent inter-polarization interference 1001 between vertical and horizontal polarizations for transmitting antenna #1, whereas $a_2$ and $b_2$ represent inter-polarization interference 1001 between vertical and horizontal polarizations for transmitting antenna #2.

In Eq. (14), $\varphi_{1V}^{(T)}$, $\varphi_{1H}^{(T)}$, $\varphi_{2V}^{(T)}$, $\varphi_{2H}^{(T)}$ are phase noise relating to the vertically- and horizontally-polarized signals transmitted from transmitting antennas #1, #2 and represented by phase rotators 802. Similarly, $\varphi_{1V}^{(R)}$, $\varphi_{1H}^{(R)}$, $\varphi_{2V}^{(R)}$, $\varphi_{2H}^{(R)}$ in Eq. (15) are phase noise relating to the vertically- and horizontally-polarized signals received at receiving antennas #1, #2 and represented by phase rotators 807. The vertically- and horizontally-polarized signals received at receiving antennas #1, #2 are affected by thermal noise. This is represented by addition of noise signals $n_{1V}$, $n_{1H}$, $n_{2V}$, $n_{2H}$ in adders 808.

Received signal sequences $r_{1V}$, $r_{1H}$, $r_{2V}$, $r_{2H}$ in Eq. (12) are supplied to MIMO demodulating apparatus 500. The role of this demodulating apparatus is to estimate transmitted signals $s_{1V}$, $s_{1H}$, $s_{2V}$, $s_{2H}$ from the given received signal sequences $r_{1V}$, $r_{1H}$, $r_{2V}$, $r_{2H}$.

As shown in Eq. (12), when noise signals $n_{1V}$, $n_{1H}$, $n_{2V}$, $n_{2H}$ resulting from thermal noise are neglected, received signals $r_{1V}$, $r_{1H}$, $r_{2V}$, $r_{2H}$ take a form of transmitted signals $s_{1V}$, $s_{1H}$, $s_{2V}$, $s_{2H}$ being successively multiplied from the left side by matrixes $H_{DP}$, $\Phi^{(T)}$, $\Phi^{(R)}$ shown in Eq. (13), Eq. (14) and Eq. (15). Accordingly, similarly to the first exemplary embodiment, the demodulating apparatus performs procedures of removing the effects of the three matrixes in order.

In this exemplary embodiment, similarly to the case of the first exemplary embodiment, two phase difference correctors 101 suppress the influence of receiver-side phase noise $\Phi^{(R)}$, four interference compensators 502 remove the effect of matrix $H_{DP}$ that represents inter-polarization interference and interference due to MIMO transmission, and four phase noise compensators 103 remove the influence of transmitter-side phase noise $\Phi^{(T)}$.

Received signals $r_{1V}$, $r_{1H}$, $r_{2V}$, $r_{2H}$ supplied to MIMO demodulating apparatus 500 are supplied first to two phase difference correctors 101. As described above, received signals $r_{1V}$, $r_{2V}$ are supplied to one of phase difference correctors 101, whereas received signals $r_{1H}$, $r_{2H}$ are supplied to the other phase difference correctors 101. That is, the received signals having the same polarized direction are supplied to the same phase difference corrector 101.

The details of phase difference corrector 101 are as in the description of the first exemplary embodiment. Two phase difference correctors 101 in this exemplary embodiment perform phase correction to $\Delta_V$, $\Delta_H$ as shown in Eq. (16).

$$\Delta_V = \frac{(\varphi_{1V}^{(R)} - \varphi_{2V}^{(R)})}{2}, \quad \Delta_H = \frac{(\varphi_{1H}^{(R)} - \varphi_{2H}^{(R)})}{2}. \tag{16}$$

Accordingly, the output signals, i.e., phase corrected signals $r_{1V}'$, $r_{1H}'$, $r_{2V}'$, $r_{2H}'$ of phase difference correctors 101 in response to four received signals $r_{1V}$, $r_{1H}$, $r_{2V}$, $r_{2H}$ are written as $e^{-j\Delta_V}r_{1V}$, $e^{-j\Delta_H}r_{1H}$, $e^{+j\Delta_V}r_{2V}$, $e^{+j\Delta_H}r_{2H}$, respectively. On the other hand, similarly to residual phase noise $\psi_1$, $\psi_2$ explained in the first exemplary embodiment (see Eq. (4)), $\psi_{1V}$, $\psi_{1H}$, $\psi_{2V}$, $\psi_{2H}$ are defined as residual noise shown by the following Eq. (17) and Eq. (18).

$$\psi_{1V} = \varphi_{1V}^{(T)} = \frac{(\varphi_{1V}^{(R)} + \varphi_{2V}^{(R)})}{2}, \quad \psi_{2V} = \varphi_{2V}^{(T)} = \frac{(\varphi_{1V}^{(R)} + \varphi_{2V}^{(R)})}{2}, \tag{17}$$

$$\psi_{1H} = \varphi_{1H}^{(T)} = \frac{(\varphi_{1H}^{(R)} + \varphi_{2H}^{(R)})}{2}, \quad \psi_{2H} = \varphi_{2H}^{(T)} = \frac{(\varphi_{1H}^{(R)} + \varphi_{2H}^{(R)})}{2}. \tag{18}$$

Output signals $r_{1V}'$, $r_{1H}'$, $r_{2V}'$, $r_{2H}'$ of two phase difference corrector 101 are supplied to four interference compensator 502 in accordance with interconnection network 501 shown in FIG. 11.

Figure 14:
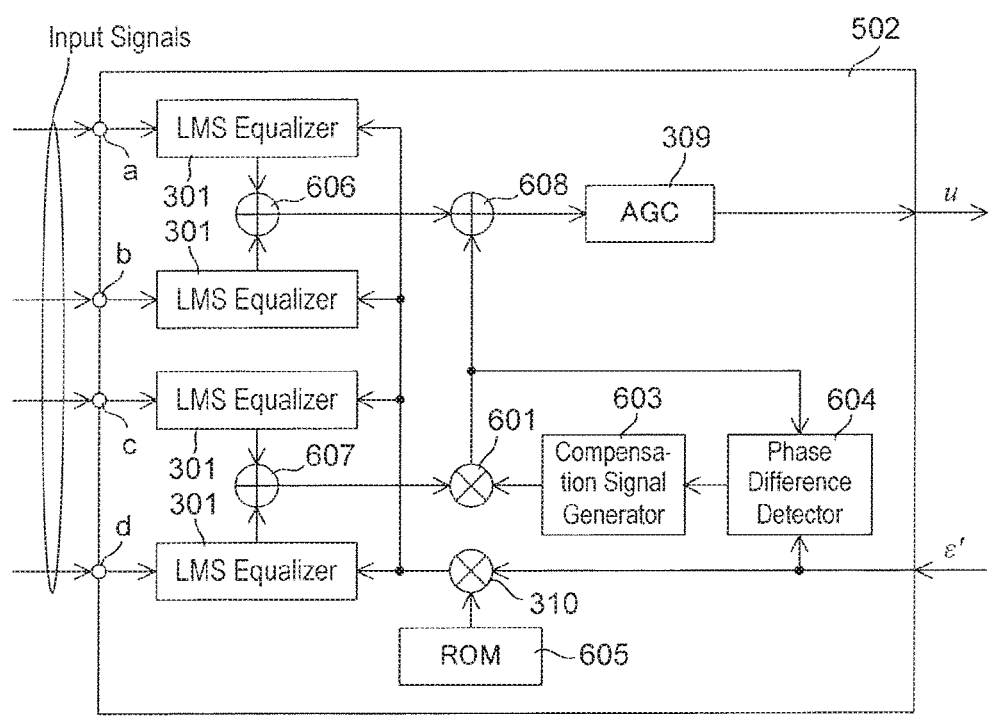
FIG. 14 is a block diagram showing one example of a configuration of an interference compensator in the apparatus shown in FIG. 11.

FIG. 14 shows one example of a configuration of interference compensator 502. Interference compensator 502 includes: four input terminals a to d for receiving signals $r_{1V}'$, $r_{1H}'$, $r_{2V}'$, $r_{2H}'$; four LMS equalizers 301; three adders 606 to 608 for adding the outputs from four LMS equalizers 301; AGC unit 309; phase rotator 601; compensation signal generator 603; phase difference detector 604; multiplier 310; and ROM 605. Phase rotator 601, compensation signal generator 603 and phase difference detector 604 are called different-polarization component phase rotator, different-polarization compensation signal generator and different-polarization phase difference detector, respectively. These components constitute a different-polarization phase compensator. LMS equalizer 301 in the present exemplary embodiment has the same configurations and functions as the LMS equalizer in the first exemplary embodiment does, and is provided for each input terminal. On the assumption of interconnection network 501 shown in FIG. 14, the signals supplied to input terminals a and b have the same polarization component, and these have a polarization identical to that of output signal u of interference compensator 502. On the other hand, the signals supplied to input terminals c and d have the same polarization component, but these have a polarization different from that of output signal u of interference compensator 502. To deal with this, in interference compensator 502, the outputs of two LMS equalizers 301 connected to input terminals a, b are summed at adder 606 while the outputs of two LMS equalizers 301 connected to input terminals c, d are summed at adder 607 and then the output of adder 607 is phase-rotated by phase rotator 601. The output of adder 606 and the phase-rotated signal of the output of adder 607 are summed at adder 608, and the output of 608 is supplied to AGC unit 309. AGC unit 309 has the same configuration as the AGC unit in the first exemplary embodiment, so produces output signal u of interference compensator 502 or a desired signal.

Phase difference detector 604 detects the phase difference between phase-compensated error signal $\varepsilon'$ that is supplied from phase rotator 105 and the output of phase rotator 601, and supplies the result to compensation signal generator 603. Compensation signal generator 603, based on detected phase difference, generates a compensation signal, and phase rotator 601 effects a phase rotating process with a phase rotation amount in accordance with the compensation signal. Phase-compensated error signal $\varepsilon'$ from phase rotator 105 is also supplied to multiplier 310. In multiplier 310, the error signal is multiplied by a constant stored in ROM 605, and the error signal after multiplication is supplied to each LMS equalizer 301.

Since MIMO demodulating apparatus 500 includes four interference compensators 502, each having four LMS equalizers 301, MIMO demodulating apparatus 500 has, in total, sixteen LMS equalizers 301. The tap coefficients of these sixteen LMS equalizers 301 are written in a matrix representation shown in Eq. (19).

$$W = \begin{bmatrix} w_{1V1V} & w_{1V1H} & w_{1V2V} & w_{1V2H} \\ w_{1H1V} & w_{1H1H} & w_{1H2V} & w_{1H2H} \\ w_{2V1V} & w_{2V1H} & w_{2V2V} & w_{2V2H} \\ w_{2H1V} & w_{2H1H} & w_{2H2V} & w_{2H2H} \end{bmatrix}. \tag{19}$$

In Eq. (19), for example, $w_{1V2H}$ represents a tap coefficient of LMS equalizer 301 that links output data $D_{1V}$ and received signal $r_{2H}$ in FIG. 14. In general, $w_{ABXY}$ represents a tap coefficient of LMS equalizer 301 that links output data $D_{AB}$ and received signal $r_{XY}$.

For sixteen LMS equalizers 301, the matrix that has, as its elements, optimal tap coefficients of which the mean square error becomes minimum, is written as $W^o$, the matrix satisfies the following Eq. (20).

$$W^o = \left(H_{DP}^\dagger H_{DP} + \frac{4\sigma^2}{P}I\right)^{-1} H_{DP}^\dagger, \tag{20}$$

where, P is transmission power, $\sigma^2$ gives each variance of noise signals $n_{1V}$, $n_{1H}$, $n_{2V}$, $n_{2H}$ in Eq. (12). It is difficult to directly perform calculation of Eq. (20) including derivation of the inverse matrix. Therefore, similar to the case explained in the first exemplary embodiment, the tap coefficients W of the LMS equalizers become close to $W^o$ in Eq. (20) by updating from appropriate initial values, based on use of the aftermentioned error signals $\varepsilon_{1V}$, $\varepsilon_{1H}$, $\varepsilon_{2V}$, $\varepsilon_{2H}$ in the following procedure shown in Eq. (21).

$$W \leftarrow W + \mu \begin{bmatrix} \varepsilon_{1V} r_{1V}'^\dagger & \varepsilon_{1V} r_{1H}'^\dagger & \varepsilon_{1V} r_{2V}'^\dagger & \varepsilon_{1V} r_{2H}'^\dagger \\ \varepsilon_{1H} r_{1V}'^\dagger & \varepsilon_{1H} r_{1H}'^\dagger & \varepsilon_{1H} r_{2V}'^\dagger & \varepsilon_{1H} r_{2H}'^\dagger \\ \varepsilon_{2V} r_{1V}'^\dagger & \varepsilon_{2V} r_{1H}'^\dagger & \varepsilon_{2V} r_{2V}'^\dagger & \varepsilon_{2V} r_{2H}'^\dagger \\ \varepsilon_{2H} r_{1V}'^\dagger & \varepsilon_{2H} r_{1H}'^\dagger & \varepsilon_{2H} r_{2V}'^\dagger & \varepsilon_{2H} r_{2H}'^\dagger \end{bmatrix}, \tag{21}$$

where, $\mu$ is a numeric value that is held in ROM 605 in FIG. 14 and set so as to suffice the following inequality (Eq. (22)).

$$0 < \mu < \frac{2}{\lambda_m}, \quad (22)$$

where $\lambda_m$ is the maximum eigenvalue of $(P/4)H_{DP}H_{DP}^{\dagger} + \sigma^2 I$.

Next, the roles and operations of phase difference detector 604, compensation signal generator 603 and phase rotator 601 in interference compensator 502 shown in FIG. 14 will be described.

As described above, MIMO demodulating apparatus 500 is aimed at removing phase noise arising in received signals $r_{1V}$, $r_{1H}$, $r_{2V}$, $r_{2H}$, interference between polarizations and interference due to MIMO transmission. Ideally, this can be achieved by calculating the following Eq. (23) by setting $W=W^0$.

$$(\Phi^{(T)})^{-1} W (\Phi^{(R)})^{-1} \begin{bmatrix} r_{1V} \\ r_{1H} \\ r_{2V} \\ r_{2H} \end{bmatrix} = \quad (23)$$

$$\begin{bmatrix} e^{-j\psi_{1V}} (w_{1V1V} r'_{1V} + w_{1V2V} r'_{2V} + e^{-j\rho}(w_{1V1H} r'_{1H} + w_{1V2H} r'_{2H})) \\ e^{-j\psi_{1H}} (w_{1H1H} r'_{1H} + w_{1H2H} r'_{2H} + e^{+j\rho}(w_{1H1V} r'_{1V} + w_{1H2V} r'_{2V})) \\ e^{-j\psi_{2V}} (w_{2V1V} r'_{1V} + w_{2V2V} r'_{2V} + e^{-j\rho}(w_{2V1H} r'_{1H} + w_{2V2H} r'_{2H})) \\ e^{-j\psi_{2H}} (w_{2H1H} r'_{1H} + w_{2H2H} r'_{2H} + e^{+j\rho}(w_{2H1V} r'_{1V} + w_{2H2V} r'_{2V})) \end{bmatrix},$$

where $r_{1V}'$, $r_{1H}'$, $r_{2V}'$, $r_{2H}'$ are output signals of phase difference correctors 101 while $\rho$ is given by the following Eq. (24).

$$\rho = (\varphi_{1H}^{(R)} + \varphi_{2H}^{(R)})/2 - (\varphi_{1V}^{(R)} + \varphi_{2V}^{(R)})/2 \quad (24).$$

Phase difference detector 604, compensation signal generator 603 and the phase rotator play a role to compensate for the influence of phase noise component $\rho$ shown in Eq. (24). This operation will be described in detail.

As to the output signals from two LMS equalizers 301 to which, of the four input signals to interference compensator 502, the signals supplied to input terminals c, d are supplied, the signal obtained from adder 607 that outputs the sum of the aforementioned output signals is phase-rotated by phase rotator 601 by the amount of the output signal of compensation signal generator 603, i.e., the compensation signal. The output signal of compensation signal generator 603 gives an estimated value of phase noise component $\rho$. Phase difference detector 604 detects the phase difference between the output signal from phase rotator 601 and the error signal for updating the tap coefficients of the LMS equalizers and supplies the detection to compensation signal generator 603 to update the estimated value of phase noise component $\rho$. Specifically, the compensation signal generator calculates phase noise component $\rho$ by cutting off the high-frequency component of the phase difference detected by phase difference detector 604 through a low-pass filter and cumulatively adding the phase difference after the filtering process. The signal on the different-polarization side which is phase corrected by phase rotator 601 is added to the signal on the subject polarization side, which is the sum of the output signals of two LMS equalizers 301 to which the signals supplied to input terminals a, b are supplied, whereby interference between different polarizations due to polarization multiplexing, as well as intersymbol interference and interference due to MIMO multiplexing, can be removed.

As the final description on MIMO demodulating apparatus 500, the roles of phase noise compensator 103, signal determiner 104 and phase rotator 105 will be described. Four phase noise compensators 103 receive the output signals from four interference compensators 502, i.e., desired signals $u_{1V}$, $u_{1H}$, $u_{2V}$, $u_{2H}$, respectively, and remove influence of residual phase noise $\psi_{1V}$, $\psi_{1H}$, $\psi_{2V}$, $\psi_{2H}$, as shown in Eq. (23). The configuration and operation of each phase noise compensator 103 is that described in the first exemplary embodiment. Signal determiner 104 also has the same role and operates in the same manner as described in the first exemplary embodiment, and receives the output signal from phase noise compensator 103. Signal determiner 104 outputs data corresponding to the transmitted signal closest to the input signal, and outputs the difference between the input signal and the transmitted signal closest thereto as an error signal. The same can be said as to phase rotator 105. The error signal supplied from signal determiner 104 is subjected to a phase rotating process in phase rotator 105 to be the error signal $\epsilon'$ for LMS equalizers 301 in interference compensator 502. The phase rotation amount at phase rotator 105 is set at a value obtained by multiplying the phase rotation amount in phase rotator 401 in phase noise compensator 103 by −1.

Figure 15:
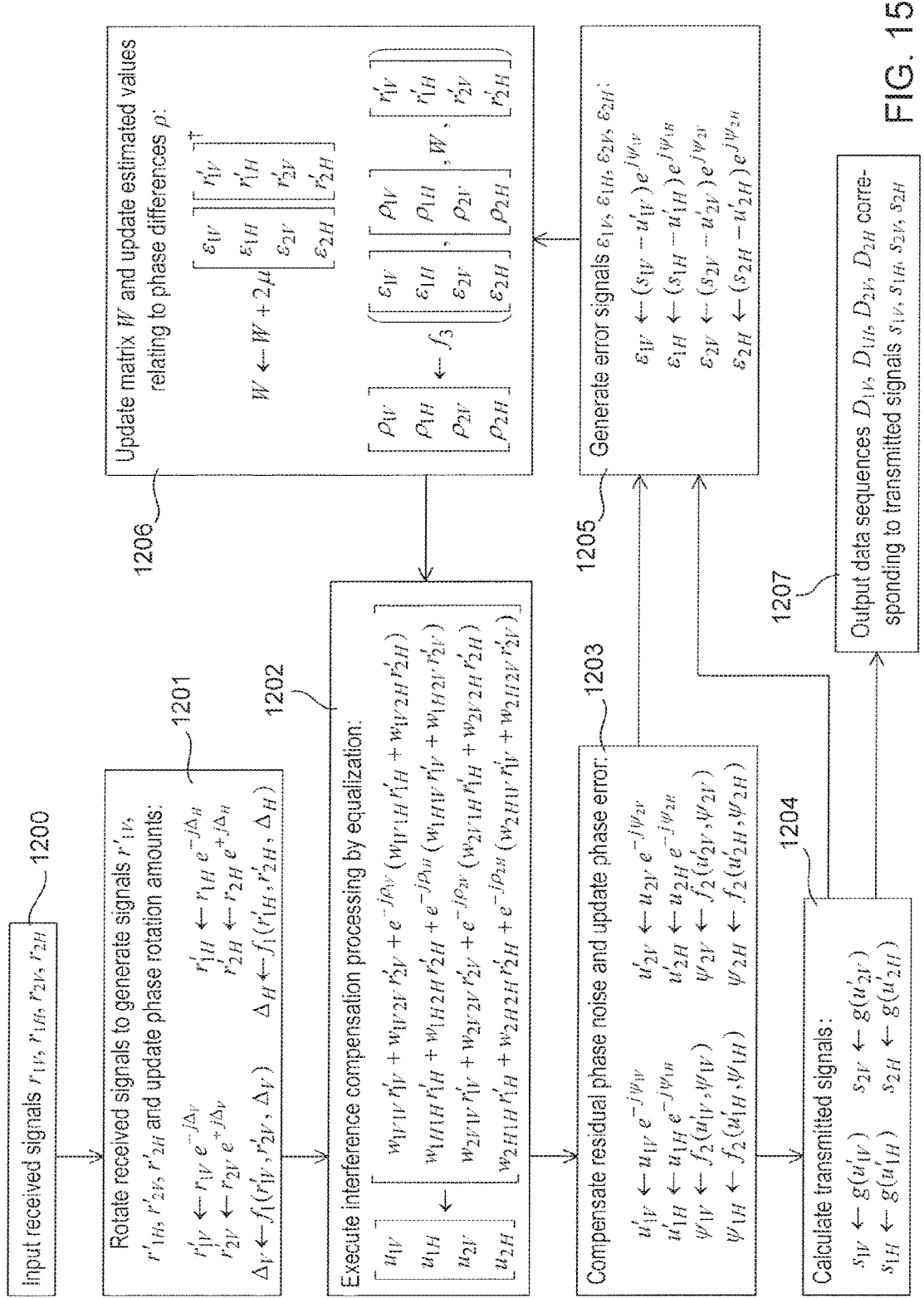
FIG. 15 is a diagram for illustrating a demodulating process in the MIMO demodulating apparatus shown in FIG. 11.

FIG. 15 shows the relationship between processing steps in the processing sequence of polarization multiplexing line-of-sight MIMO demodulation implemented by MIMO demodulating apparatus 500 in the second exemplary embodiment. In the drawing, the arrows show the flows of signals and parameters between processing steps.

MIMO demodulating apparatus 500 has input of received signals $r_{1V}$, $r_{1H}$, $r_{2V}$, $r_{2H}$ as shown at Step 1200. Then, at Step 1201 the phase of received signals $r_{1V}$, $r_{2V}$ is rotated by $-\Delta_V$, $+\Delta_V$, respectively, and, based on the resultant signals $r_{1V}'$, $r_{2V}'$ and $\Delta_V$, the numeric value of $\Delta_V$ is updated. In parallel with this, the phase of received signals $r_{1H}$, $r_{2H}$ is rotated by $-\Delta_H$, $+\Delta_H$, respectively, and, based on the resultant signals $r_{1H}'$, $r_{2H}'$ and $\Delta_H$, the numeric value of $\Delta_H$ is updated. Function $f_1$ in the box showing Step 1201 expresses the effect of phase difference corrector 101 as a function. Next, at Step 1202, MIMO demodulating apparatus 500 performs an interference compensation process by equalization so as to calculate signals $u_{1V}$, $u_{1H}$, $u_{2V}$, $u_{2H}$ from signals $r_{1V}'$, $r_{1H}'$, $r_{2V}'$, $r_{2H}'$. The operations executed at Step 1202 express the process of operations in interference compensator 502. At Step 1203, MIMO demodulating apparatus 500 compensates for residual phase noise by rotating the phase of signals $u_{1V}$, $u_{1H}$, $u_{2V}$, $u_{2H}$ by $-\psi_{1V}$, $-\psi_{1H}$, $-\psi_{2V}$, $-\psi_{2H}$, respectively to calculate signals $u_{1V}'$, $u_{1H}'$, $u_{2V}'$, $u_{2H}'$. Also, based on the obtained signals $u_{1V}'$, $u_{1H}'$, $u_{2V}'$, $u_{2H}'$ and $\psi_{1V}$, $\psi_{1H}$, $\psi_{2V}$, $\psi_{2H}$, the numeric values of $\psi_{1V}$, $\psi_{1H}$, $\psi_{2V}$, $\psi_{2H}$ are updated. Function $f_2$ in the box showing Step 1203 expresses the effect of phase error detector 402 and compensation signal generator 403 in phase noise compensator 103, as a function.

At Step 1204, MIMO demodulating apparatus 500 calculates the closest transmitted signals $s_{1V}$, $s_{1H}$, $s_{2V}$, $s_{2H}$ from signals $u_{1V}'$, $u_{1H}'$, $u_{2V}'$, $u_{2H}'$, respectively. Function g in the box showing Step 1204 expresses the effect of calculating transmitted signals in signal determiner 104 as a function. At Step 1207, MIMO demodulating apparatus 500 outputs data sequences corresponding to transmitted signals $s_{1V}$, $s_{1H}$, $s_{2V}$, $s_{2H}$ as output data $D_{1V}$, $D_{1H}$, $D_{2V}$, $D_{2H}$, and at the same time, generates error signals $\epsilon_{1V}$, $\epsilon_{1H}$, $\epsilon_{2V}$, $\epsilon_{2H}$ at Step 1205 and updates, at Step 1206, matrix W to be used in Step 1202 for equalization using error signals $\epsilon_{1V}$, $\epsilon_{1H}$, $\epsilon_{2V}$, $\epsilon_{2H}$. Further, the estimated values $\rho_{1V}$, $\rho_{1H}$, $\rho_{2V}$, $\rho_{2H}$ related to phase difference $\rho$ shown in Eq. (24) are updated. Function $f_3$ in the box showing Step 1206 expresses the effect of phase difference detector 604 and compensation signal corrector 603 in interference compensator 502 as a function. Thereafter, the same loop of deriving output data $D_{1V}$, $D_{1H}$, $D_{2V}$, $D_{2H}$ by estimating transmitted signals $s_{1V}$, $s_{1H}$, $s_{2V}$, $s_{2H}$ from supplied received signals $r_{1V}$, $r_{1H}$, $r_{2V}$, $r_{2H}$ is iterated.

Also, in MIMO demodulating apparatus 500 of the present exemplary embodiment, phase difference correctors 101, interference compensators 502, phase noise compensators 103, signal determiners 104 and phase rotators 105 can be configured by hardware components. Alternatively, a computer program that causes a computer to execute the steps from Steps 1200 to 1207 shown in FIG. 15 may be prepared, and loaded on the memory of the computer so that the CPU of the computer can run the program to realize MIMO demodulating apparatus 500. Alternatively, some of phase difference correctors 101, interference compensators 502, phase noise compensators 103, signal determiners 104 and phase rotators 105 may be configured by hardware while the others may be realized as functional components by software.

Figure 16:
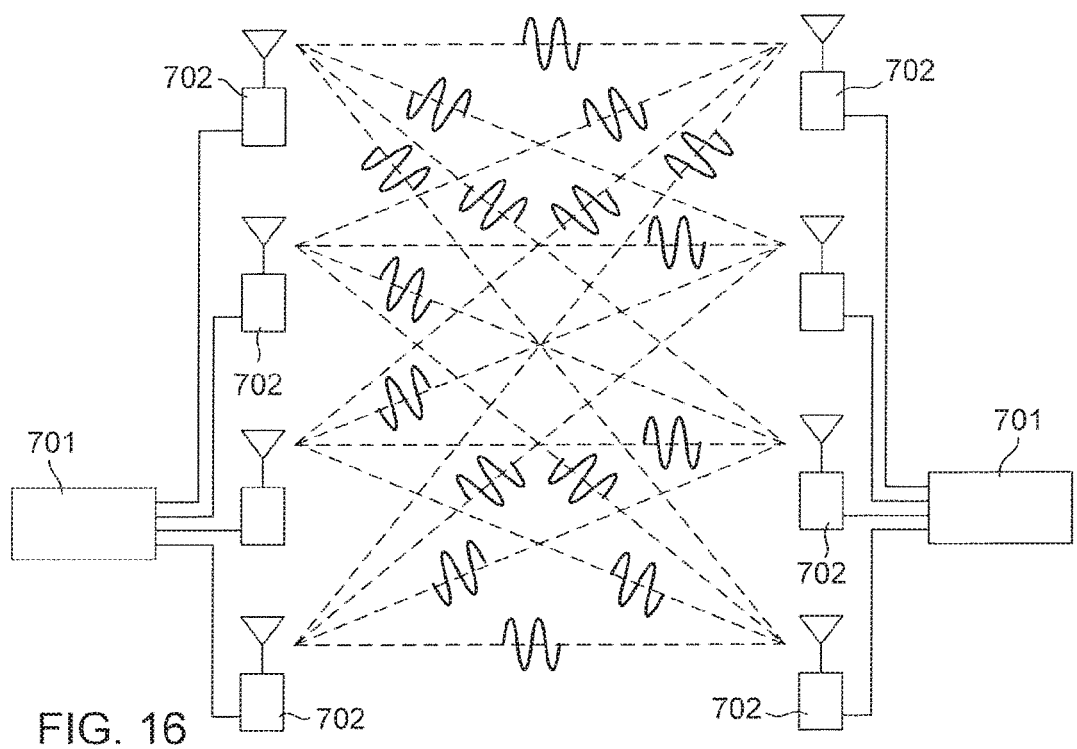
FIG. 16 is a block diagram showing a configuration of a 4×4 line-of-sight MIMO transmission system.

The present invention has been described heretofore by giving exemplary embodiments of 2×2 line-of-sight MIMO demodulation with the degree of spatial multiplexing set at 2. However, MIMO demodulation based on the present invention should not be limited to this, but can be applied to a line-of-sight MIMO transmission system having the degree of spatial multiplexing set to be greater than 2. As one example, FIG. 16 shows a configuration of a line-of-sight MIMO wireless transmission system having the degree of spatial multiplexing set at 4 with four transmitting antennas and four receiving antennas. Either of the transmitting and receiving sides is comprised of indoor unit 701 and outdoor units 702 having antennas. Four outdoor units 702 are connected to indoor unit 701.

Next, as the third exemplary embodiment of the present invention, a MIMO demodulating apparatus used in an N×N line-of-sight MIMO communications system including N receiving antennas (N is a natural number of 3 or greater) will be described. In the first and second exemplary embodiments, in order to compensate for independent phase noise arising at two receiving antennas, two-input phase difference correctors are used. In the third exemplary embodiment, the phase difference corrector in the first and second exemplary embodiments is extended into an N-input phase difference corrector for compensating phase noise at N receiving antennas.

Figure 17:
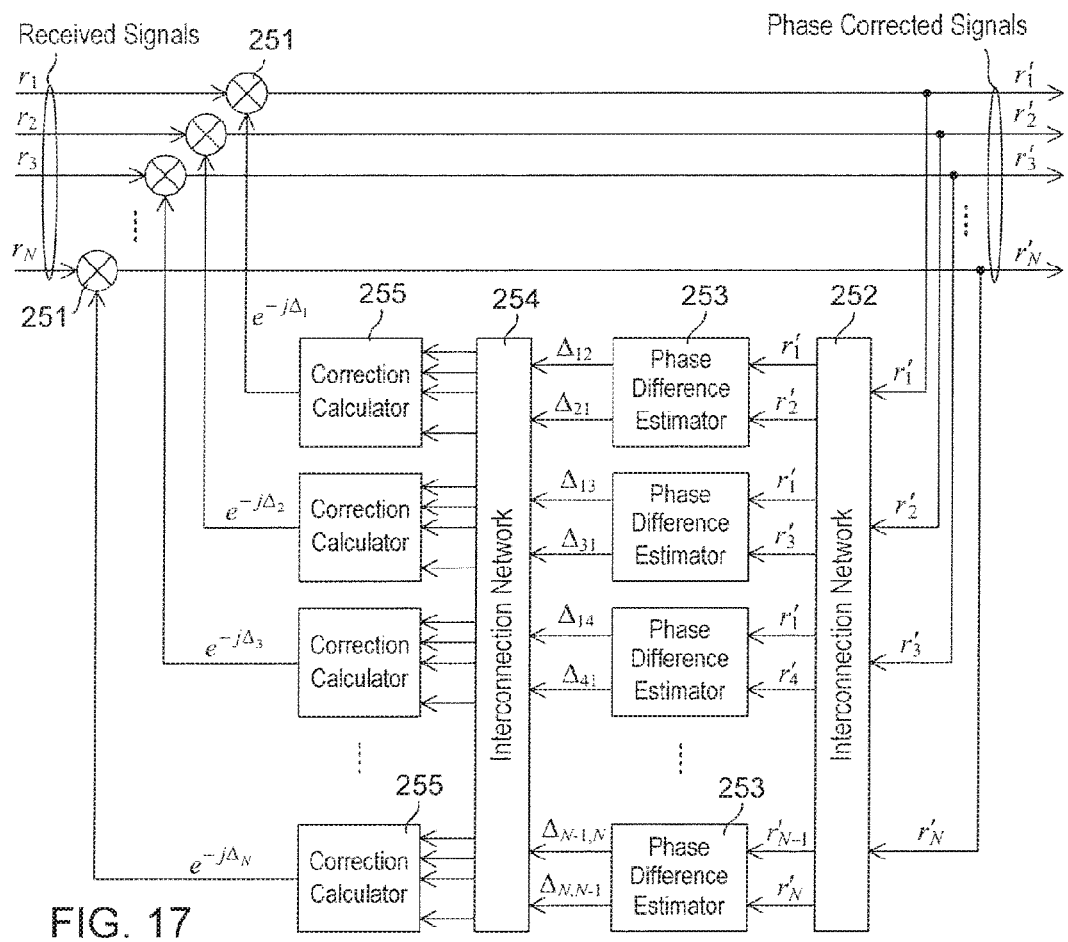
FIG. 17 is a block diagram showing a configuration of a phase difference corrector in a MIMO demodulating apparatus according to a third exemplary embodiment of the present invention.

FIG. 17 shows a phase difference corrector used in a MIMO demodulating apparatus of the third exemplary embodiment. In FIG. 17, received signal sequences acquired from N received antennas are denoted as $r_1, r_2, r_3, \ldots, r_N$ while phase noise at these receiving antennas are represented by $\varphi_1^{(R)}, \varphi_2^{(R)}, \varphi_3^{(R)}, \ldots, \varphi_N^{(R)}$. The phase difference corrector corrects the phase of received signals $r_1, r_2, r_3, \ldots, r_N$ by $\Delta_1, \Delta_2, \Delta_3, \ldots, \Delta_N$ to output signal sequences $r_1 e^{-j\Delta_1}, r_2 e^{-j\Delta_2}, r_3 e^{-j\Delta_3}, \ldots, r_N e^{-j\Delta_N}$. The output signal sequences are phase corrected signals $r_1', r_2', r_3', \ldots, r_N'$ corresponding to received signals $r_1, r_2, r_3, \ldots, r_N$. Herein, $\Delta_1, \Delta_2, \Delta_3, \ldots, \Delta_N$ are given by the following Eq. (25).

$$\Delta_l = \frac{1}{N}\sum_{m=1}^{N}(\varphi_l^{(R)} - \varphi_m^{(R)}), l = 1, 2, 3, \ldots, N. \quad (25)$$

The amounts of residual phase noise indicated by differences between phase quantity $\Delta_1, \Delta_2, \Delta_3, \ldots, \Delta_N$ and $\varphi_1^{(R)}$, $\varphi_2^{(R)}, \varphi_3^{(R)}, \ldots, \varphi_N^{(R)}$ take the value of $\psi$ given by the following Eq. (26) without depending on the receiving antenna.

$$\psi = \frac{1}{N}\sum_{l=1}^{N}\varphi_l^{(R)}. \quad (26)$$

Similarly to the cases in the aforementioned first and second embodiments, correction relating to this residual phase noise $\psi$ will be performed after equalization in the interference compensator.

Phase correction amount $\Delta_l$ ($l=1, \ldots, N$) shown in Eq. (25) can be obtained by calculating the amounts $\Delta_{l,m}=(\varphi_l^{(R)}-\varphi_m^{(R)})/N$ corresponding to the difference in phase noise of other antennas, and adding up them all. To deal with this, the phase difference corrector shown in FIG. 17 includes: N phase rotators 251 having input of respective received signals $r_1, r_2, r_3, \ldots, r_N$; $N(N-1)/2$ phase difference estimators 253 for calculating phase difference $\Delta_{l,m}$ for all the combinations of two receiving antennas selected from N receiving antennas; N correction calculators 255 each calculating phase correcting amount $\Delta_l$ for the corresponding receiving antenna by summing obtained phase differences $\Delta_{l,m}$ to output the phase rotation amount to phase rotator 251; and two interconnection networks 252, 254. Phase rotator 251 is also called received signal phase rotator. Outputs of N phase rotators 251 are supplied as phase corrected signals $r_1', r_2', r_3', \ldots, r_N'$ and distributed to $N(N-1)/2$ phase difference estimators 253 via interconnection network 252. The $N(N-1)$ outputs from $N(N-1)/2$ phase difference estimators 253 are distributed to N correction calculators 255 via interconnection network 254.

Figure 18:
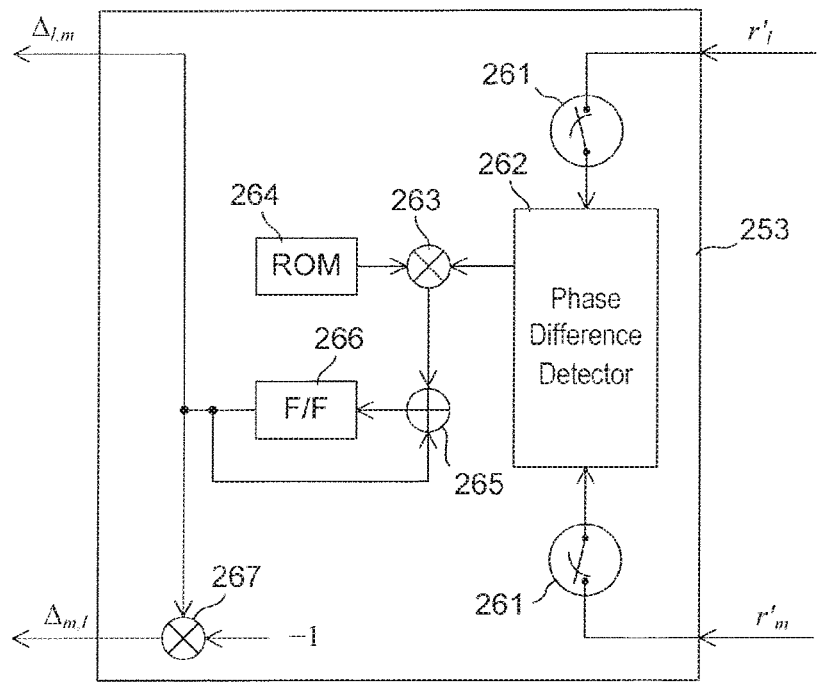
FIG. 18 is a block diagram showing a configuration of a phase difference estimator used in the MIMO demodulating apparatus of the third exemplary embodiment.

FIG. 18 shows configuration of phase difference estimator 253. The phase difference corrector receives input of phase corrected signals $r_l', r_m'$ and outputs phase differences $\Delta_{l,m}$, $\Delta_{m,l}$ therebetween, and includes: two switches 261; phase difference detector 262; two multipliers 263, 267; ROM 264; adder 265; and flip-flop 266. Phase difference detector 262 is the same as the phase difference detector in the first exemplary embodiment, and is supplied with phase corrected signals $r_l', r_m'$ via switch 261 arranged for each of these signals $r_l', r_m'$ to detect the phase difference therebetween. The detected phase difference is multiplied by a constant in ROM 264 by multiplier 263 and then the result is added to the output of flip-flop 266 by means of adder 265. The output from adder 265 is supplied to flip-flop 266 so that phase differences are added up by adder 265 and flip-flop 266. The output of flip-flop 266 is given as phase difference $\Delta_{l,m}$ and multiplied by −1 at multiplier 267 to be output as phase difference $\Delta_{m,l}$.

Figure 19:
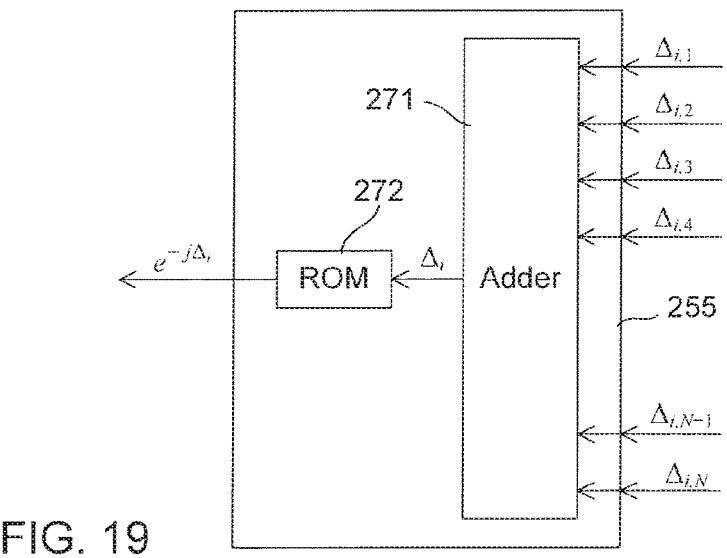
FIG. 19 is a block diagram showing a configuration of a correction calculator used in the MIMO demodulating apparatus of the third exemplary embodiment.

FIG. 19 shows a configuration of correction calculator 255. The correction calculator 255 corresponding to received signal $r_i$ includes: adder 271 that adds $\Delta_{i,1}$, $\Delta_{i,2}, \ldots, \Delta_{i,N-1}, \Delta_{i,N}$ supplied from multiple phase difference estimators 253 via interconnection network 254 to output the result as phase difference signal $\Delta_i$; and ROM 272 that outputs a phase rotation amount $e^{-j\Delta_i}$ corresponding to the supplied phase difference signal $\Delta_i$ to phase rotator 251 corresponding to received signal $r_i$. ROM 272 stores the relationship between phase difference signals and phase rotation amounts.

In this way, phase difference estimator 253 in this exemplary embodiment operates in the same manner as phase difference corrector 101 in the first exemplary embodiment, and calculates phase difference information $\Delta_{l,m}$ and $\Delta_{m,l}$ $(=(-1) \times \Delta_{l,m})$, from two received signals $r_l$, $r_m$. Correction calculator 255 adds up the output signals of phase difference estimators 253 and calculates phase noise correction amount $\Delta_l$ (l=1, 2, 3, . . . , N) and outputs corresponding phase rotation amount $e^{-j\Delta_l}$.

In the third exemplary embodiment, N, the number of receiving antennas, is assumed to be three or greater. Herein, the configuration of the phase difference corrector when N=2 substantially corresponds to the phase difference corrector in the first exemplary embodiment shown in FIG. 2 because unnecessary adders can be left out.

Although not illustrated in FIG. 17, the MIMO demodulating apparatus of the third exemplary embodiment, similarly to the first exemplary embodiment, includes N N-input interference compensators. Each interference compensator is provided with: a phase noise compensator; a signal determiner; and a phase rotator. The N-input interference compensator is the same as that used in a typical N×N non-line-of-sight MIMO demodulating apparatus. The phase correcting signals from the phase difference correctors $r_1 e^{-j\Delta_1}, r_2 e^{-j\Delta_2}, r_3 e^{-j\Delta_3}, \ldots, r_N e^{-j\Delta_N}$ are respectively supplied to the interference compensators. Accordingly, in the MIMO demodulating apparatus of this exemplary embodiment, phase noise at receiving antennas is compensated for by the phase noise compensator shown in FIG. 17 and the results are subjected to interference compensation process by equalization in the N interference compensators. Thereafter, the same processing as in the MIMO demodulating apparatus of the first exemplary embodiment is performed so that output data corresponding to N transmitted signals on the transmitting side are respectively delivered from the N signal determiners. Further, in the present exemplary embodiment, inter-polarization interference may also be considered as in the second exemplary embodiment, so that it is possible to construct a MIMO demodulating apparatus for polarization multiplexing N×N line-of-sight MIMO communications system.

The MIMO demodulating apparatus in each of the above exemplary embodiments can be favorably applied, in general, to digital wireless communication apparatuses including, as examples, mobile terminal devices, basic radio apparatuses.

Although the present invention has been explained with reference to the exemplary embodiments, the present invention should not be limited to the above exemplary embodiments. Various modifications that can be understood by those skilled in the art may be made to the structures and details of the present invention within the scope of the present invention.

REFERENCE SIGNS LIST 100, 500 MIMO demodulating apparatus;
101 phase difference corrector;
102, 502 interference compensator;
103 phase noise compensator;
104 signal determiner;
105, 201, 251, 401, 601, 802, 805, 807 phase rotator;
202, 261 switch;
203, 262, 604 phase difference detector;
204 low-pass filter (LPF);
205, 265, 271, 306 to 308, 606 to 608, 806, 808 adder;
206, 266, 302, 303 flip-flop (F/F);
207, 208, 264, 272, 311, 605 read-only memory (ROM);
253 phase difference estimator;
255 correction calculator;
301 LMS equalizer;
263, 267, 304, 305, 310 multiplier;
309 automatic gain control (AGC) unit;
402 phase error detector;
403, 603 compensation signal generator.

The invention claimed is:

1. A MIMO demodulating apparatus which is used in a line-of-sight multiple input multiple output wireless communications system that uses multiple transmitting antennas and multiple receiving antennas to implement multiplexing of channels utilizing difference in transmission delay adjusted based on inter-antenna spacing, and which estimates transmitted data from received signals respectively received at the multiple receiving antennas, comprising:
a phase difference corrector that compensates for phase shift of each received signal by utilizing phase difference between received signals received at the multiple receiving antennas to output a phase corrected signal of each of the received signals;
an interference compensator that receives the multiple phase corrected signals as input and, by means of adaptive control, performs elimination of interference in the received signals inclusive of intersymbol interference, and separation and extraction of a desired signal from multiplexed signals transmitted through the transmission channels to output the desired signal;
a phase noise compensator connected to the interference compensator to compensate for phase error remaining in the desired signal;
a signal determiner that determines transmitted data from the output signal of the phase noise compensator to output the transmitted data, and outputs difference between the output signal from the phase noise compensator and the transmitted data as an error signal; and
an error signal phase rotator that subjects the error signal to a phase rotating process in accordance with a phase error compensation amount at the phase noise compensator,
wherein the error signal subjected to the phase rotating process at the error signal phase rotator is used for adaptive control in the interference compensator, and
the phase difference is determined in the phase difference corrector, based on a signal that is inserted into a sequence of a transmitted signal and known to a receiving side.

2. The MIMO demodulating apparatus according to claim 1, wherein
the phase difference corrector includes:
a phase difference detector that detects the phase difference only when the received signal from each of the receiving antennas is the known signal;
an adder that cumulatively adds up output signals from the phase difference detector; and
a received signal phase rotator that performs a phase rotating process on each of the received signals in accordance with an output of the adder to output the phase corrected signal.

3. The MIMO demodulating apparatus according to claim 2, wherein
the phase noise compensator includes:
a phase error detector that calculates phase difference between the desired signal and a transmitted signal closest to the desired signal;
a compensation signal generator that generates a signal for phase error compensation based on an output signal of the phase error detector; and a desired signal phase rotator that rotates phase of the desired signal in accordance with the signal generated by the compensation signal generator to output the rotated signal, and the phase error detector and the compensation signal generator are connected via the desired signal phase rotator to constitute a phase locked loop.

4. The MIMO demodulating apparatus according to claim 3, wherein
the interference compensator includes:
a plurality of least mean square equalizers that are provided as many as the number of the received signals separated based on polarization components to respectively correspond to the phase corrected signals;
an adder that is provided for each polarized component to add up outputs of the multiple least mean square equalizers corresponding to the polarized component;
a different-polarization phase-corrector that corrects phase of an output of the adder corresponding to a phase component of different polarization with regard to an output of the interference compensator; and
an adder that adds up an output of the adder corresponding to a phase component of same polarization with regard to the output of the interference compensator and the output of the phase corrector, in order to generate the desired signal, and
the error signal supplied from the error signal phase rotator in order to control filter coefficients of the least mean square equalizers, is commonly supplied to the plurality of least mean square equalizers.

5. The MIMO demodulating apparatus according to claim 4, wherein
the different-polarization phase-corrector includes:
a different-polarization phase rotator that rotate the phase of the output of the adder corresponding to the phase component of different polarization;
a different-polarization phase difference detector that detects the difference of the phase difference between the error signal supplied from the error signal phase rotator and the output of the different-polarization phase rotator; and
a different-polarization compensation signal generator that generates a signal for controlling a phase rotation amount at the different-polarization phase rotator in accordance with an output of the detector.

6. The MIMO demodulating apparatus according to claim 1, wherein
the phase noise compensator includes:
a phase error detector that calculates phase difference between the desired signal and a transmitted signal closest to the desired signal;
a compensation signal generator that generates a signal for phase error compensation based on an output signal of the phase error detector; and
a desired signal phase rotator that rotates phase of the desired signal in accordance with the signal generated by the compensation signal generator to output the rotated signal, and
the phase error detector and the compensation signal generator are connected via the desired signal phase rotator to constitute a phase locked loop.

7. The MIMO demodulating apparatus according to claim 6, wherein
the line-of-sight multiple input and multiple output wireless communications system is a system in which, in addition to the multiplexing utilizing difference in transmission delay, polarization multiplexing is performed by using two polarized components orthogonal to each other between the multiple transmitting antennas and the multiple receiving antennas,
the phase difference corrector is provided for each of the polarized components, and
the interference compensator removes inter-polarization interference in addition to intersymbol interference.

8. The MIMO demodulating apparatus according to claim 1, wherein
the interference compensator includes:
a plurality of least mean square equalizers as many as the number of the received signals; and
an adder that adds up outputs of the plurality of least mean square equalizers in order to generate the desired signal,
the least mean square equalizers corresponds to a plurality of the phase corrected signals, respectively, and receive the corresponding phase corrected signals as input, and
the error signal supplied from the error signal phase rotator in order to control filter coefficients of the least mean square equalizers, is commonly supplied to the plurality of least mean square equalizers.

9. The MIMO demodulating apparatus according to claim 1, wherein
the line-of-sight multiple input and multiple output wireless communications system is a system in which, in addition to the multiplexing utilizing difference in transmission delay, polarization multiplexing is performed by using two polarized components orthogonal to each other between the multiple transmitting antennas and the multiple receiving antennas,
the phase difference corrector is provided for each of the polarized components, and
the interference compensator removes inter-polarization interference in addition to intersymbol interference.

10. The MIMO demodulating apparatus according to claim 9, wherein
the interference compensator includes:
a plurality of least mean square equalizers that are provided as many as the number of the received signals separated based on polarization components to respectively correspond to the phase corrected signals;
an adder that is provided for each polarized component to add up outputs of the multiple least mean square equalizers corresponding to the polarized component;
a different-polarization phase-corrector that corrects phase of an output of the adder corresponding to a phase component of different polarization with regard to an output of the interference compensator; and
an adder that adds up an output of the adder corresponding to a phase component of same polarization with regard to the output of the interference compensator and the output of the phase corrector, in order to generate the desired signal, and
the error signal supplied from the error signal phase rotator in order to control filter coefficients of the least mean square equalizers, is commonly supplied to the plurality of least mean square equalizers.

11. The MIMO demodulating apparatus according to claim 10, wherein
the different-polarization phase-corrector includes:
a different-polarization phase rotator that rotate the phase of the output of the adder corresponding to the phase component of different polarization;
a different-polarization phase difference detector that detects the difference of the phase difference between the error signal supplied from the error signal phase rotator and the output of the different-polarization phase rotator; and
a different-polarization compensation signal generator that generates a signal for controlling a phase rotation amount at the different-polarization phase rotator in accordance with an output of the detector.

12. The MIMO demodulating apparatus according to claim 1, wherein the known signal is at least one of a preamble added to a transmitted frame for synchronization capture and a pilot signal periodically inserted into the sequence of the transmitted signal.

13. A MIMO demodulating method which, in a line-of-sight multiple input multiple output wireless communications system that uses multiple transmitting antennas and multiple receiving antennas to implement multiplexing of channels utilizing difference in transmission delay adjusted based on inter-antenna spacing, estimates transmitted data from received signals respectively received at the multiple receiving antennas, the method comprising:
determining phase difference between the received signals received by the multiple receiving antennas, based on a signal that is known to a receiving side and inserted in a sequence of a transmitted signal;
outputting a phase corrected signal by compensating for phase shift of each received signal by utilizing the phase difference;
performing, for a plurality of the phase corrected signals, elimination of interference in the received signals inclusive of intersymbol interference, and separation and extraction of a desired signal from multiplexed signals transmitted through the transmission channels, by means of adaptive control;
compensating for phase error remaining in the desired signal;
determining and outputting transmitted data based on the desired signal of which the phase error has been compensated for; and
regarding difference between the desired signal of which the phase error has been compensated for and the transmitted data as an error signal and subjecting the error signal to a phase rotating process in accordance with a phase error compensation amount,
wherein the error signal having been subjected to the phase rotating process is used for the adaptive control.

14. The method according to claim 13, wherein the line-of-sight multiple input and multiple output wireless communications system is a system which, in addition to the multiplexing utilizing difference in transmission delay, performs polarization multiplexing by using two polarized components orthogonal to each other between the multiple transmitting antennas and the multiple receiving antennas, further comprising:
determining the phase difference for each of the polarized components and compensating for the phase shift of each of the received signals to output the phase corrected signal; and
removing inter-polarization interference in each of the received signals.

15. The method according to claim 13, the multiple receiving antennas being two receiving antennas, wherein, when the received signals received respectively at the two receiving antennas are denoted as $r_1$ $r_2$:
in the determining phase difference, phase rotation amount $\Delta$ is determined based on the phase difference;
the outputting comprises generating phase corrected signals $r_1'$, $r_2'$ by rotating phase of the received signals $r_1$, $r_2$ by $\Delta$ in opposite directions to each other and updating the phase rotation amount $\Delta$ by using the phase corrected signals $r_1'$, $r_2'$;
the performing comprises calculating desired signals $u_1$, $u_2$ that are obtained from the phase corrected signals $r_1'$, $r_2'$ by removing intersymbol interference and interference resulting from multiplexing of the transmission channels by a multiplying and adding process of the phase corrected signals $r_1'$, $r_2'$ with a tap coefficient W in least mean square equalization;
the compensating comprises correcting the desired signals $u_1$, $u_2$ by phase rotation $\psi_1$, $\psi_2$ resulting from phase noise to calculate signals $u_1'$, $u_2'$ and updating the phase rotation amounts $\psi_1$, $\psi_2$;
the determining and outputting comprises calculating transmitted signals $s_1$, $s_2$ closest to the signals $u_1'$, $u_2'$;
the regarding comprises calculating error signals $\epsilon_1$, $\epsilon_2$ by subjecting difference values of the transmitted signals $s_1$, $s_2$ from the signals $u_1'$, $u_2'$ to phase rotation of phase rotation amounts $\psi_1$, $\psi_2$, respectively; and
the adaptive control includes updating the tap coefficient W of the least mean square equalization by use of the error signals $\epsilon_1$, $\epsilon_2$ and the signals $r_1'$, $r_2'$.

16. The method according to claim 13, the multiple receiving antenna being two receiving antenna, the line-of-sight multiple input and multiple output wireless communications system being a system which, in addition to the multiplexing utilizing difference in transmission delay, performs polarization multiplexing by using two polarized components orthogonal to each other between the multiple transmitting antennas and the two receiving antennas, wherein, when the received signals received respectively at the two receiving antennas are denoted as $r_{1V}$, $r_{1H}$, $r_{2V}$, $r_{2H}$:
in the determining phase difference, phase rotation amounts $\Delta_V$, $\Delta_H$ are determined for based on the phase difference for the respective polarized components;
the outputting comprises generating phase corrected signals $r_{1V}'$, $r_{2V}'$ by rotating phase of the received signals $r_{1V}$, $r_{2V}$ of one of the polarized components of the received signals $r_{1V}$, $r_{1H}$, $r_{2V}$, $r_{2H}$, by $\Delta_V$ in opposite directions to each other, generating phase corrected signals $r_{1H}'$, $r_{2H}'$ by rotating phase of the received signals $r_{1H}$, $r_{2H}$ of the other of the polarized components by $\Delta_H$ in opposite directions to each other, and then updating the phase rotation amounts $\Delta_V$, $\Delta_H$ using the phase corrected signals $r_{1V}'$, $r_{2V}'$ and $r_{1H}'$, $r_{2H}'$;
the performing comprises calculating desired signals $u_{1V}$, $u_{1H}$, $u_{2V}$, $u_{2H}$ that are obtained from the phase corrected signals $r_{1V}'$, $r_{1H}'$, $r_{2V}'$, $r_{2H}'$ by removing intersymbol interference, inter-polarization interference resulting from polarization multiplexing and interference resulting from multiplexing of the transmission channels, by a multiplying and adding process of the phase corrected signals $r_{1V}'$, $r_{2V}'$, $r_{1H}'$, $r_{2H}'$ with a tap coefficient W in least mean square equalization and a phase rotating process by phase shifts $\rho_{1V}$, $\rho_{1H}$, $\rho_{2V}$, $\rho_{2H}$ between polarizations;
the compensating comprises correcting the desired signals $u_{1V}$, $u_{1H}$, $u_{2V}$, $u_{2H}$ by phase rotation amounts $\psi_{1V}$, $\psi_{1H}$, $\psi_{2V}$, $\psi_{2H}$ resulting from residual phase noise to calculate signals $u_{1V}'$, $u_{1H}'$, $u_{2V}'$, $u_{2H}'$ and updating the phase rotation amounts $\psi_{1V}$, $\psi_{1H}$, $\psi_{2V}$, $\psi_{2H}$;

the determining and outputting comprises calculating transmitted signals $s_{1V}$, $s_{1H}$, $s_{2V}$, $s_{2H}$ closest to the signals $u_{1V}'$, $u_{1H}'$, $u_{2V}'$, $u_{2H}'$;

the regarding comprises calculating error signals $\varepsilon_{1V}$, $\varepsilon_{1H}$, $\varepsilon_{2V}$, $\varepsilon_{2H}$ by subjecting the difference values of the transmitted signals $s_{1V}$, $s_{1H}$, $s_{2V}$, $s_{2H}$ from the signals $u_{1V}'$, $u_{1H}'$, $u_{2V}'$, $u_{2H}'$ to phase rotation of the phase rotation amounts $\psi_{1V}$, $\psi_{1H}$, $\psi_{2V}$, $\psi_{2H}$, respectively; and the adaptive control includes updating the tap coefficient W of the least mean square equalization and the phase shifts $\rho_{1V}$, $\rho_{1H}$, $\rho_{2V}$, $\rho_{2H}$ between the polarizations by use of the error signals $\varepsilon_{1V}$, $\varepsilon_{1H}$, $\varepsilon_{2V}$, $\varepsilon_{2H}$ and the signals $r_{1V}'$, $r_{1H}'$, $r_{2V}'$, $r_{2H}'$.

17. A line-of-sight multiple input and multiple output wireless communications system that performs multiplexing of transmission channels based on the difference between transmission delays adjusted by spacing distance between antennas, comprising:

a transmitter including a plurality of transmitting antennas each sending out a transmitted signal; and a receiver including a plurality of receiving antennas, and a MIMO demodulating apparatus for estimating transmitted data from the received signal received at each of the receiving antennas, wherein the MIMO demodulating apparatus comprises:

a phase difference corrector that compensates for phase shift of each received signal by utilizing phase difference between received signals received at the multiple receiving antennas to output a phase corrected signal of each of the received signals;

an interference compensator that receives the multiple phase corrected signals as input and, by means of adaptive control, performs elimination of interference in the received signals inclusive of intersymbol interference, and separation and extraction of a desired signal from multiplexed signals transmitted through the transmission channels to output the desired signal;

a phase noise compensator connected to the interference compensator to compensate for phase error remaining in the desired signal;

a signal determiner that determines transmitted data from the output signal of the phase noise compensator to output the transmitted data, and outputs difference between the output signal from the phase noise compensator and the transmitted data as an error signal; and an error signal phase rotator that subjects the error signal to a phase rotating process in accordance with a phase error compensation amount at the phase noise compensator, wherein the error signal subjected to the phase rotating process at the error signal phase rotator is used for adaptive control in the interference compensator, and the phase difference is determined in the phase difference corrector, based on a signal that is inserted in a sequence of the transmitted signal and known to the receiver.

18. The line-of-sight multiple input and multiple output wireless communications system according to claim 17, wherein the phase difference corrector is provided for each of two polarized components orthogonal to each other, the interference compensator removes inter-polarization interference in addition to inter-symbol interference, and in addition to the multiplexing by utilizing the difference in transmission delay, polarization multiplexing using the two polarized components is performed between the multiple transmitting antennas and the multiple receiving antennas.

* * * * *

UNITED STATES PATENT AND TRADEMARK OFFICE
CERTIFICATE OF CORRECTION

| | | |
|---|---|---|
| PATENT NO. | : 10,009,133 B2 | Page 1 of 1 |
| APPLICATION NO. | : 15/540834 | |
| DATED | : June 26, 2018 | |
| INVENTOR(S) | : Norifumi Kamiya | |

It is certified that error appears in the above-identified patent and that said Letters Patent is hereby corrected as shown below:

On the Title Page

Column 1, (*) Notice, Line 3; Delete "days. days." and insert --days.-- therefor In the Specification Column 1, Cross Reference to Related Applications, Line 8; Delete "State" and insert --Stage-- therefor In the Claims Column 30, Claim 15, Line 4; After "r$_1$", insert --,--

Signed and Sealed this
Nineteenth Day of February, 2019

Andrei Iancu
*Director of the United States Patent and Trademark Office*